(12) United States Patent
Hojo et al.

(10) Patent No.: US 8,945,769 B2
(45) Date of Patent: Feb. 3, 2015

(54) ACCUMULATOR MATERIAL AND ACCUMULATOR DEVICE

(75) Inventors: Nobuhiko Hojo, Osaka (JP); Yu Ohtsuka, Osaka (JP); Takakazu Yamamoto, Kanagawa (JP); Takahisa Shimizu, Kanagawa (JP); Takayuki Sasaki, Kanagawa (JP); Tomoaki Yanagida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 894 days.

(21) Appl. No.: 12/997,516

(22) PCT Filed: Jul. 31, 2009

(86) PCT No.: PCT/JP2009/003648
§ 371 (c)(1),
(2), (4) Date: Dec. 10, 2010

(87) PCT Pub. No.: WO2010/013491
PCT Pub. Date: Feb. 4, 2010

(65) Prior Publication Data
US 2011/0091767 A1 Apr. 21, 2011

(30) Foreign Application Priority Data
Jul. 31, 2008 (JP) ................. 2008-198502

(51) Int. Cl.
*H01M 4/60* (2006.01)
*C08G 61/12* (2006.01)
(Continued)

(52) U.S. Cl.
CPC ........... *C08G 61/123* (2013.01); *H01M 4/1399* (2013.01); *H01M 4/60* (2013.01); *H01M 4/606* (2013.01); *C08G 2261/148* (2013.01);
(Continued)

(58) Field of Classification Search
USPC .............. 429/188, 213, 212, 332, 231.8; 526/156; 549/36
See application file for complete search history.

(56) References Cited

U.S. PATENT DOCUMENTS

2004/0045818 A1  3/2004  Inatomi et al.
2004/0214082 A1  10/2004  Inatomi et al.

FOREIGN PATENT DOCUMENTS

JP  01-172382 A  7/1989
JP  2004-111374  4/2004
(Continued)

OTHER PUBLICATIONS

Takakazu Yamamoto et al., "New π-conjugated polymers containing Tetrathiafulvalene as the monomeric unit," J. Mater. Chem., 1997, 7 (10), pp. 1967-1968.
(Continued)

*Primary Examiner* — Patrick Ryan
*Assistant Examiner* — Alex Usyatinsky
(74) *Attorney, Agent, or Firm* — McDermott Will & Emery LLP

(57) ABSTRACT

An electricity storage device including a positive electrode 31, a negative electrode 32, and an electrolytic solution 29 located between the positive electrode and the negative electrode. At least one of the positive electrode 31 and the negative electrode 32 contains an electricity storage material containing a polymerization product having a tetrachalcogenofulvalene structure in a repeat unit of a main chain.

6 Claims, 5 Drawing Sheets

(51) Int. Cl.
    H01M 4/1399       (2010.01)
    H01M 10/052       (2010.01)
(52) U.S. Cl.
    CPC .. C08G2261/3422 (2013.01); C08G 2261/344
           (2013.01); H01M 10/052 (2013.01); Y02E
                                  60/122 (2013.01)
    USPC .......... 429/213; 429/188; 429/212; 429/332;
                              429/231.8; 526/256; 549/36

(56)                References Cited

FOREIGN PATENT DOCUMENTS

| JP | 2004-143297 | | 5/2004 |
|---|---|---|---|
| JP | 2004-342605 | | 12/2004 |
| JP | 2007281107 | A | 10/2007 |
| JP | 2007305461 | A | 11/2007 |
| JP | 2008-159275 | | 7/2008 |
| WO | WO 2007/116926 | A1 | 10/2007 |

OTHER PUBLICATIONS

Takakazu Yamamoto et al., "New Soluble π-conjugated Tetrathiafulvalene (TTF) Polymers Bearing Long Alkl Side Chains: Preparation by Organometallic Polycondensation, Structure and Chemical Properties of the Polymers," Mol. Cryst. Liq., vol. 381, 101-112, 2002.
Tomoaki Yanagida et al., "Synthesis of New π-Conjugated Polymers with Tetrathiafulvalene," Polymer Preprints, Japan, vol. 49, No. 11, Sep. 2000 pp. 3420-3421.
Takayuki Sasaki et al., "Syntheses of New π-Conjugated Polymers Having a Tetrathiafulvalene (TTF) Unit in the Main Chain and Having Alkyl Group as the Side Chain," Polymer Preprints, Japan vol. 48, No. 10, Sep. 1999, pp. 2359-2360.
Tomoaki Yanagida et al., "Synthesis of New π-Conjugated Copolymers with Tetrathiafulvalene and Aromatic Compounds," Polymer Preprints, Japan, vol. 49, No. 4 May 2000, pp. 738.
Jun-ichi Yamada et al., "TTF Chemistry; Fundamentals and Applications of Tetrathiafulvalene," Kodansha, Springer, 2004, pp. 35-58 and 83-135.
Takakazu Yamamoto, "Cross-coupling reactions for preparation of π-conjuagted polymers," Journal of Organometallic Chemistry 653 (2002) 195-199.
Chi-Han Lee et al., "Synthesis of Liquid Crystals with Bent-Rod Structure: 4-Methylthiazole Derivatives with Nematic Phase," Mol. Crys. Liq. Cryst. vol. 369, pp. 95-102.
Chinese Office Action, and partial English translation thereof, issued in Chinese Patent Application No. 200980100475.5 mailed Nov. 16, 2012.
Wang, Erjing et al. "Synthesis and Characterization of New Type Molecular Wires with Tetrathiafulvalene as Redox Center." Journal of Polymer Science: Part A: Polymer Chemistry. vol. 44. pp. 2707-2713. Feb. 8, 2006.
Extended European Search Report issued in Application No. 09802736.0-1301 mailed Oct. 30, 2013.

Gruber H et al: "Electrical properties of poly(tetrathiafulvalenes)", Synthetic Metals, Elsevier Sequoia, Lausanne, CH, vol. 42, No. 3, May 29, 1991, pp. 2331-2334.
Gruber H et al: "Mossbauer and Raman spectroscopy studies on iodine-doped poly(tetrathiafulvalenes)", Synthetic Metals, Elsevier Sequoia Lausanne, CH, vol. 44, No. 1, Jul. 1, 1991, pp. 55-64.
Thobie-Gautier C et al:"Electrosynthesis of a Tetrathiafulvalene-Derivatized Poly (Thiophene)", Macromolecules, Americal Chemical Society, Washington, DC; US, vol. 26, No. 16, Aug. 2, 1993, pp. 4094-4099.
Bryce M R et al: "Towards highly oriented polythiophenes incorporating mesogenic or tetrathiafulvalene substituents", Synthetic Metals, Elsevier Sequoia, Lausanne, CH, vol. 39, No. 3, Jan. 1, 1991, pp. 397-400.
Frenzel S et al: "Synthesis of tetrathiafulvene polymers", Journal of Materials Chemistry, Royal Society of Chemistry, GB, vol. 5, No. 10, Jan. 1, 1995, pp. 1529-1537.
Marc Fourmigue et al: "Tetrathiafulvalene- and tithiafulvene-substituted mesitylenes, new P-donor molecules with 3-fold symmetry and the formation of an unprecedented new class of electroactive polymers", Journal of the American Chemical Society, vol. 115, No. 9, May 1, 1993, pp. 3752-3759.
Dr Le Van Hinh et al: "Tetrathiafulvalene. VII [1]. Arylenverbruckte polymere Tetrathiafulvalene", Journal Fur Praktische Chemie, Wiley, vol. 321, No. 2, Jan. 1, 1979, pp. 299-307.
Trinh V Q et al: "Tetrathiafulvalenes. XXV. Conjugatively connected polymeric tetrathiafulvalenes (TTF)", Journal Fuer Praktische Chemie, Leipzig, DE, vol. 331, No. 5, Jan. 1, 1989, pp. 826-834).
Roth H Klaus et al: "ESR and ESE studies on polymer semiconductors of weakly doped poly(tetrathiafulvalene)", Macromolecular Symposia, Weinheim : Wiley-VCH, 1986-1998, 9: Basel ; Heidelberg [U.A.] ; Huthig & Wepf, CH, vol. 34, Jan. 1, 1990, pp. 293-307.
Roth Hans Klaus et al: "ESR studies on polymers with particular electronic and magnetic properties", Macromolecular Symposia, Winheim : Wiley-VCH, 1986-1998, 8: Basel ; Heidelber :U.A] ; Huthig & Wepf, CH, vol. 72, Jan. 1, 1993, pp. 143-159.
Wang Jian-Hua et al with English Abstract: "Synthesis of thienyl and furyl tetrathiafulvalenes and their electrochemical properties", Gaodeng Xuexiao Huaxue Xuebao—Chemical Journal of Chineseuniversities, Jilin Daxue, Beijing, CH, vol. 18, No. 3, Jan. 1, 1997, pp. 399-403.
Dr G Schukat et al: "Leitfahhige Polymere mit Tetrathiafulvalenstruktur", Journal Fuer Praktische Chemie, Wiley VCH, Weinheim, DE, vol. 320, No. 3, Jan. 1, 1978, pp. 404-412.
Roth H K et al: "ESR on polymer semiconductors of poly (tetrathiafulvalene)", Progress in Colloid & Polymer Science, Steinkopff Verlag, Darmstadt, DE, vol. 78, Jan. 1, 1988, pp. 75-78.
Schukata G et al: "Synthesis, Reactions, and Selected Physico-Chemical Properties of 1,3- and 1,2-Tetrachalcogenafulvalenes", Sulfur Reports, Harwood Academic Publishers, Chur, CH, vol. 7, No. 3, Jan. 1, 1987, pp. 155-231.
Roth H K et al: "Electron spin resonance and relaxation studies on conducting poly(tetrathiafulvalenes)", Progress in Colloid & Polymer Science, Steinkopff Verlag, Darmstadt, DE, vol. 80, Jan. 1, 1989, pp. 254-263.

ACCUMULATOR MATERIAL AND ACCUMULATOR DEVICE

RELATED APPLICATIONS

This application is the U.S. National Phase under 35 U.S.C. §371 of International Application No. PCT/JP2009/003648, filed on Jul. 31, 2009, which in turn claims the benefit of Japanese Application No. 2008-198502, filed on Jul. 31, 2008, the disclosures of which Applications are incorporated by reference herein.

TECHNICAL FIELD

The present invention relates to an electricity storage material and an electricity storage device using the same.

BACKGROUND ART

Recently, mobile electronic devices such as mobile audio devices, mobile phones, laptop computers and the like have been widely used, and various types of secondary batteries have been used as power supplies for such mobile electronic devices. Also, a demand for secondary batteries having a much larger capacity than is provided for the mobile electronic devices has been increased. For example, from the viewpoint of energy savings or reduction of carbon dioxide emission, hybrid vehicles using an electric driving power in addition to the conventional engine are becoming popular. For these reasons, secondary batteries having further improved characteristics of output, capacity, cycle life and the like are now desired regardless of the usage.

A secondary battery accumulates charges using an oxidation/reduction reaction. Therefore, a substance which is reversibly oxidation/reduction-reactable, namely, an electricity storage material which accumulates charges, greatly influences the above-described characteristics of the secondary battery. Conventional secondary batteries use metals, carbon, inorganic compounds and the like as the electricity storage materials. In the case of, for example, lithium secondary batteries widely used today, metal oxides, graphite and the like are used as positive electrode active substances and negative electrode active substances which are electricity storage materials.

In place of these inorganic materials, it is now being studied to use organic compounds as the electricity storage materials. Organic compounds allow more diversified molecule designs than inorganic compounds. It is considered that when an organic compound is used as an active substance, such an active substance can have various characteristics by molecule design.

Organic compounds are more lightweight than metals. Therefore, when a secondary battery is formed using an electricity storage material formed of an organic compound, the obtained secondary battery can be lightweight. For this reason, organic compounds are considered to be preferable for secondary batteries for hybrid vehicles, which do not need to have a high charging density but need to be lightweight. It has also been studied to use capacitors as electricity storage devices for hybrid vehicles. The above-described advantages of organic compounds are also provided when electricity storage materials formed of organic compounds are used for capacitors using a chemical reaction.

In Patent Documents Nos. 1 and 2, the present inventors have proposed an organic compound having a π-conjugated electron cloud as a novel electricity storage material which can provide high speed charge/discharge, and clarified a reaction mechanism thereof.

CITATION LIST

Patent Literature

Patent Document No. 1: Japanese Laid-Open Patent Publication No. 2004-111374
Patent Document No. 2: Japanese Laid-Open Patent Publication No. 2004-342605

SUMMARY OF INVENTION

Technical Problem

For an electrolytic solution of an electricity storage device, a non-aqueous solvent is used in order to broaden the usable voltage range. Therefore, when an organic compound is used as the electricity storage material, a problem arises that the electricity storage material may occasionally elute into the electrolytic solution. Even if the solubility of the electricity storage material in the electrolytic solution is very low, if the electricity storage material elutes little by little while the charge/discharge operation is repeated, a good charge/discharge cycle characteristic is not obtained.

The present invention has an object of solving such problems of the conventional art and providing a novel active substance containing an organic compound which does not elute into an electrolytic solution and has excellent characteristics of output, capacity, cycle life and the like and also an electricity storage device using the same.

Solution to Problem

An electricity storage material according to the present invention contains a polymerization product which has a tetrachalcogenofulvalene structure in a repeat unit of a main chain.

In a preferable embodiment, the main chain of the polymerization product is formed of the tetrachalcogenofulvalene structures directly bonded to each other.

In a preferable embodiment, the polymerization product is a copolymerization product of two or more types of monomers which contain the tetrachalcogenofulvalene structures having different substituents from each other.

In a preferable embodiment, the polymerization product is a copolymerization product of a monomer containing at least one of an acetylene structure and a thiophene structure and a monomer containing the tetrachalcogenofulvalene structure.

In a preferable embodiment, the tetrachalcogenofulvalene structure is a tetrathiafulvalene structure.

In a preferable embodiment, the polymerization product has a degree of polymerization of 4 or greater.

In a preferable embodiment, the tetrachalcogenofulvalene structure is represented by general formula (1) shown below. In general formula (1), X is an oxygen atom, a sulfur atom, a selenium atom or a tellurium atom; two selected from R1 through R4 each represent a bond with an adjacent repeat unit; and the other two are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom.

[Formula 1]

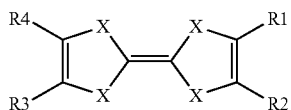

(1)

In a preferable embodiment, the polymerization product is represented by general formula (2) shown below. In general formula (2), X is an oxygen atom, a sulfur atom, a selenium atom or a tellurium atom; and R5 and R6 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom.

[Formula 2]

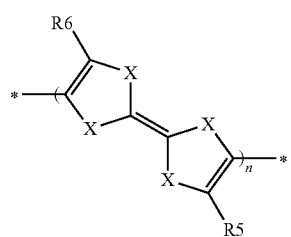

(2)

In a preferable embodiment, X is a sulfur atom; and R5 and R6 are each a chained hydrocarbon group or an aromatic group.

In a preferable embodiment, X is a sulfur atom; and R5 and R6 are each $C_6H_{13}$, $C_{10}H_{21}$, $C_8H_{17}$ or $C_6H_5$.

In a preferable embodiment, the polymerization product is a copolymerization product containing repeat units represented by general formulas (3) and (4) shown below. In general formulas (3) and (4), X is an oxygen atom, a sulfur atom, a selenium atom or a tellurium atom; and R5 through R8 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom. It should be noted that a combination of R5 and R6 is different from a combination of R7 and R8.

[Formula 3]

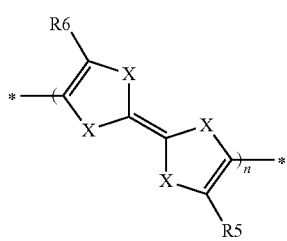

(3)

[Formula 4]

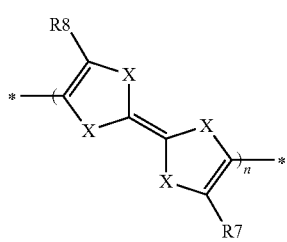

(4)

In a preferable embodiment, X is a sulfur atom; R5 and R6 are each a phenyl group; and R7 and R8 are each a chained hydrocarbon group.

In a preferable embodiment, the polymerization product is represented by general formula (5) shown below. In general formula (5), X is an oxygen atom, a sulfur atom, a selenium atom or a tellurium atom; and R5 and R6 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom. R9 is a chained unsaturated hydrocarbon group or a cyclic unsaturated hydrocarbon group each containing an acetylene structure, and contains at least one selected from the group consisting of a carbon atom, an oxygen atom, a nitrogen atom, a sulfur atom and a silicon atom.

[Formula 5]

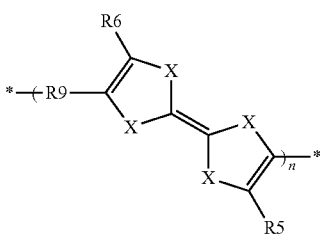

(5)

In a preferable embodiment, X is a sulfur atom; R5 and R6 are each a phenyl group or a chained hydrocarbon group; and R9 has a structure represented by chemical formula (6) shown below.

[Formula 6]

(6)

In a preferable embodiment, the polymerization product is represented by general formula (7) shown below. In general formula (7), X is an oxygen atom, a sulfur atom, a selenium atom or a tellurium atom; and R5 and R6 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom. R10 is a chained unsaturated hydrocarbon group or a cyclic unsaturated hydrocarbon group each containing a thiophene structure, and contains at least one selected from the group consisting of a carbon atom, an oxygen atom, a nitrogen atom, a sulfur atom and a silicon atom.

[Formula 7]

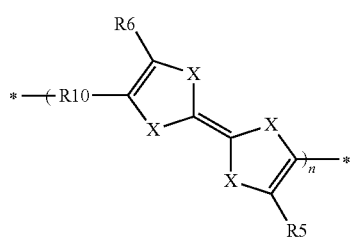
(7)

In a preferable embodiment, X is a sulfur atom; R5 and R6 are each a phenyl group or a chained hydrocarbon group; and R10 has a structure represented by any of chemical formulas (8) through (12) shown below.

[Formula 8]

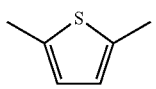
(8)

[Formula 9]

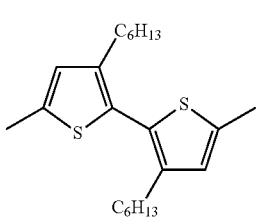
(9)

[Formula 10]

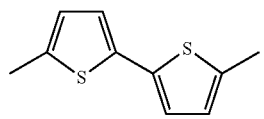
(10)

[Formula 11]

(11)

[Formula 12]

(12)

In a preferable embodiment, the polymerization product is represented by general formula (13) shown below. In general formula (13), X is an oxygen atom, a sulfur atom, a selenium atom or a tellurium atom; and R5 through R8 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom. R11 and R12 are each independently a chained unsaturated hydrocarbon group or a cyclic unsaturated hydrocarbon group each containing either an acetylene structure or a thiophene structure, and contains at least one selected from the group consisting of a carbon atom, an oxygen atom, a nitrogen atom, a sulfur atom and a silicon atom.

[Formula 13]

(13)

In a preferable embodiment, X is a sulfur atom; R5 through R8 are each a phenyl group, a chained hydrocarbon group or a thioalkyl group; and R11 and R12 each have a structure represented by chemical formula (14) shown below.

[Formula 14]

(14)

In a preferable embodiment, the polymerization product is represented by general formula (15) shown below. In general formula (15), Ph is a bivalent aromatic hydrocarbon group; X is an oxygen atom, a sulfur atom, a selenium atom or a tellurium atom; and R5 and R6 each independently contain at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom.

[Formula 15]

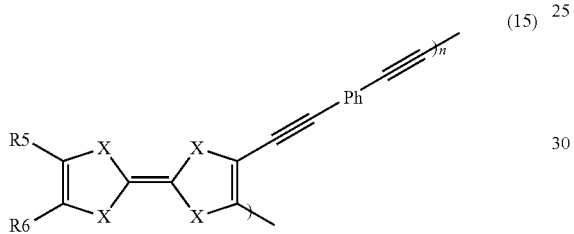
(15)

In a preferable embodiment, the polymerization product is represented by general formula (16) shown below. In general formula (16), X is an oxygen atom, a sulfur atom, a selenium atom or a tellurium atom; and R5, R6 and R13 through R16 each independently contain at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom.

[Formula 16]

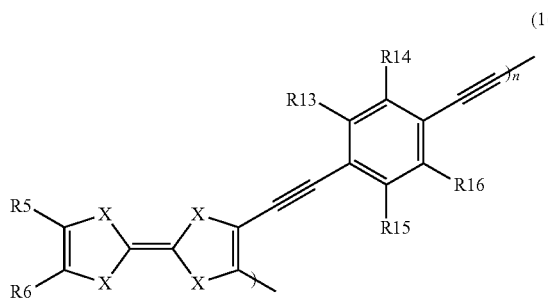
(16)

In a preferable embodiment, the polymerization product is represented by general formula (17) shown below. In general formula (17), X is an oxygen atom, a sulfur atom, a selenium atom or a tellurium atom; and R5, R6 and R13 through R16 each independently contain at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom.

[Formula 17]

(17)

In a preferable embodiment, X is a sulfur atom; R5 and R6 are each a thioalkyl group; and R13 through R16 are each a hydrogen atom.

An electrode according to the present invention comprises a conductive support; and an electricity storage layer provided on the conductive support and containing an electricity storage material defined by any one of the above.

In a preferable embodiment, the electricity storage layer contains a conductive substance.

An electrochemical element according to the present invention comprises a positive electrode, a negative electrode, and an electrolytic solution located between the positive electrode and the negative electrode. At least one of the positive electrode and the negative electrode has the above-described electrode.

In a preferable embodiment, the electrolytic solution contains a salt of a quaternary ammonium cation and an anion.

An electricity storage device according to the present invention comprises a positive electrode, a negative electrode, and an electrolytic solution located between the positive electrode and the negative electrode. At least one of the positive electrode and the negative electrode has the above-described electrode.

An electricity storage device according to the present invention comprises a positive electrode having the electrode defined by any one of the above; a negative electrode containing a negative electrode active substance capable of occluding and releasing lithium ion; and an electrolytic solution containing a salt formed of the lithium ion and an anion and filling an area between the positive electrode and the negative electrode.

A mobile electronic device according to the present invention comprises the above-described electricity storage.

A vehicle according to the present invention comprises the above-described electricity storage device.

Advantageous Effects of Invention

An electricity storage material according to the present invention contains a polymerization product having a tetrachalcogenofulvalene structure in a repeat unit of a main chain. Since the tetrachalcogenofulvalene structure which is reversibly oxidation/reduction-reactable is polymerized, the molecular weight of a molecule containing the tetrachalcogenofulvalene structure is increased, and thus the solubility thereof in an organic solvent is decreased. For this reason, an electricity storage material according to the present invention is difficult to be dissolved in an organic solvent, and so can be suppressed from eluting into an electrolytic solution even when being used in an electricity storage device. Therefore, an electricity storage device having a long cycle life is realized.

Since the tetrachalcogenofulvalene structure is contained in the main chain of the polymerization product, the site which is subjected to an oxidation/reduction reaction contributes to the polymerization of the polymerization product without the reversible oxidation/reduction reactability of tetrachalcogenofulvalene being spoiled. Therefore, a structure of the polymerization product, in which a portion that is not subjected to the oxidation/reduction reaction is as small as possible, can be formed. Owing to this, an electricity storage material having a high energy density and an excellent charge/discharge or oxidation/reduction cycle characteristic can be realized. In addition, an electricity storage device having a large output, a large capacity and an excellent cycle characteristic can be provided.

DESCRIPTION OF EMBODIMENTS

Hereinafter, an embodiment of an electricity storage material and an electricity storage device according to the present invention will be described with reference to the drawings. In this embodiment, an electricity storage material and an electricity storage device according to the present invention will be described by way of an example of a lithium secondary battery. However, the present invention is not limited to a lithium secondary battery or a positive electrode active substance of the lithium secondary battery, and is preferably applicable to a capacitor using a chemical reaction or the like.

Figure 1:
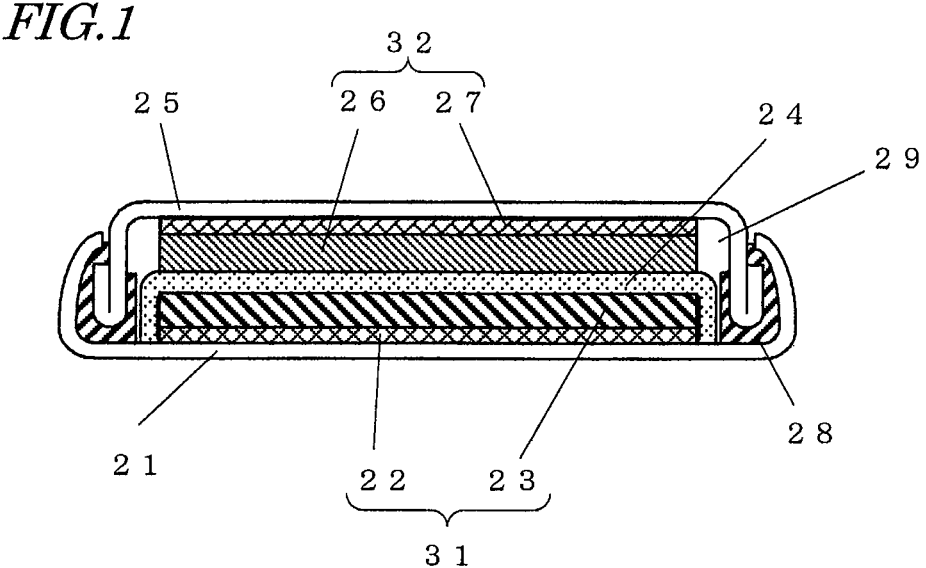
FIG. 1 is a schematic cross-sectional view showing a coin-type secondary battery as one embodiment of an electricity storage device according to the present invention.

FIG. 1 is a cross-sectional view schematically showing a lithium secondary battery as an embodiment of an electricity storage device according to the present invention. The secondary battery shown in FIG. 1 includes a positive electrode 31, a negative electrode 32 and a separator 24. The positive electrode 31 includes a positive electrode active substance layer 23 and a positive electrode current collector 22, and the positive electrode active substance layer 23 is supported by the positive electrode current collector 22. Similarly, the negative electrode 32 includes a negative electrode active substance layer 26 and a negative electrode current collector 27, and the negative electrode active substance layer 26 is supported by the negative electrode current collector 27.

As described below in detail, the positive electrode active substance layer 23 contains an electricity storage material according to the present invention as a positive electrode active substance. Usable as the positive electrode current collector 22 is, for example, a metal foil or a metal mesh formed of aluminum, gold, silver, stainless steel, an aluminum alloy or the like, or a resin film containing a conductive filler formed of such a metal.

The negative electrode active substance layer 26 contains a negative electrode active substance. The negative electrode active substance used here is a known negative electrode active substance for reversibly occluding and releasing lithium. Examples of substances usable as the negative electrode active substance include materials capable of reversibly occluding and releasing lithium such as graphite materials, e.g., natural graphite, artificial graphite, etc., non-amorphous carbon materials, lithium metal, lithium-containing composite nitrides, lithium-containing titanium oxides, silicon, alloys containing silicon, silicon oxides, tin, alloys containing tin, tin oxides, and the like; carbon materials having an electric double layer capacity such as activated carbon, etc.; organic compound materials having a π-conjugated electron cloud; and the like. Such negative electrode materials may be used independently or as a mixture of a plurality thereof. Usable for the negative electrode current collector 27 is a material which is known as being usable for a current collector of a negative electrode of a lithium ion secondary battery, for example, copper, nickel, stainless steel, or the like. Similarly to the positive electrode current collector 22, the negative electrode current collector 27 is usable in the form of a metal foil, a metal mesh or a resin film containing a conductive filler formed of a metal.

The positive electrode active substance layer 23 and the negative electrode active substance layer 26 may respectively contain only a positive electrode active substance and only a negative electrode active substance, or may each contain either one of a conductor or a binder, or both of a conductor and a binder. As the conductor, any of various electron conductive materials which are not chemically changed at a charge/discharge potential of the positive electrode active substance or the negative electrode active substance is usable. Examples of substances usable as the conductor include carbon materials such as carbon black, graphite, acetylene black and the like; conductive polymerization products such as polyaniline, polypyrrole, polythiophene and the like; conductive fibers such as carbon fiber, metal fiber and the like; metal powders; conductive whiskers; conductive metal oxides; and the like. These materials may be used independently or as a mixture thereof. An ion-conductive assisting agent may be contained in the positive electrode. Usable as the ion-conductive assisting agent is, for example, a solid electrolyte formed of polyethylene oxide or the like, or a gel electrolyte formed of poly(methyl methacrylate) or the like.

The binder may be either a thermoplastic resin or a thermosetting resin. Examples of substances usable as the binder include polyolefin resins such as polyethylene, polypropylene and the like; fluorine-based resins such as polytetrafluoroethylene (PTFE), poly(vinylidene fluoride) (PVDF), hexafluoropropylene (HFP) and the like, and copolymeric resins thereof; styrene-butadiene rubber; polyacrylic resin and copolymeric resins thereof; and the like.

The positive electrode 31 and the negative electrode 32 are located such that the positive electrode active substance layer 23 and the negative electrode active substance layer 26 face each other while sandwiching, and being in contact with, the separator 24. Thus, these elements form an electrode group. The separator 24 is a resin layer formed of a resin which does not have electron conductivity, and is a porous film having a high level of ion permeability and prescribed levels of mechanical strength and electric insulation. For the separator 24, a polyolefin resin containing polypropylene, polyethylene or the like independently or as a mixture thereof is preferable because these materials have a high organic solvent resistance and a high hydrophobicity. The separator 24 may be replaced with an ion-conductive resin layer which is swollen with an electrolytic solution and acts as a gel electrolyte.

The electrode group is accommodated in a space inside a case 21. Into the space inside the case 21, an electrolytic solution 29 is injected. The positive electrode 31, the negative electrode 32 and the separator 24 are impregnated with the electrolytic solution 29. The separator 24 contains tiny spaces for holding the electrolytic solution 29. Therefore, the electrolytic solution 29 is held in the tiny spaces, and thus is located between the positive electrode 31 and the negative electrode 32. An opening of the case 21 is sealed by a sealing plate 25 using a gasket 28.

The electrolytic solution 29 is formed of a non-aqueous solvent and a support salt soluble in the non-aqueous solvent. Usable as the non-aqueous solvent is a known solvent usable for a non-aqueous secondary battery or a non-aqueous electric double layer capacitor. Specifically, a solvent containing a cyclic carbonate ester is preferably usable because a cyclic carbonate ester has a very high relative dielectric constant as exhibited by ethylene carbonate and propylene carbonate. Among cyclic carbonate esters, propylene carbonate is preferable because propylene carbonate has a freezing point of −49° C., which is lower than that of ethylene carbonate and thus can cause the electricity storage device to operate even at a low temperature.

A solvent containing a cyclic ester is also preferably usable for the following reason. A cyclic ester has a very high relative dielectric constant as exhibited by γ-butyrolactone. Therefore, the electrolytic solution 29 containing a non-aqueous solvent which contains a cyclic ester can have a very high relative dielectric constant as a whole.

As the non-aqueous solvent, one of the above-described substances may be used or a mixture of a plurality thereof may be used. Examples of substances usable as the non-aqueous solvent include chained carbonate esters, chained esters, cyclic or chained ethers and the like. Specific examples of the substances usable as the non-aqueous solvent include dimethyl carbonate, diethyl carbonate, methylethyl carbonate, tetrahydrofran, dioxolane, sulfolane, dimethyl formamide, acetonitrile, dimethyl sulfoxide, and the like. Preferably, the relative dielectric constant of the non-aqueous solvent is 55 or greater and 90 or less.

As the support salt, a salt formed of any of the following anions and any of the following cations is usable. Usable anions include halide anion, perchloric acid anion, trifluoromethanesulfonic acid anion, tetrafluoroboric acid anion, hexafluorophosphoric acid anion, nonafluoro-1-butane-sulfonic acid anion, bis(trifluoromethanesulfonyl)imide anion, bis(perfluoroethylsulfonyl)imide anion, and the like. Usable cations include alkaline metal cations of lithium, sodium, potassium and the like; alkaline earth metal cations of magnesium and the like; quaternary ammonium cations of tetraethylammonium, 1-ethyl-3-methyl-imidazolium and the like.

As the cation, a quaternary ammonium cation or a lithium cation is preferable. A quaternary ammonium cation has a high level of ion mobility and so provides a highly conductive electrolytic solution, and also allows use of a negative electrode having an electric double layer capacity such as activated carbon or the like, which has a high reaction rate, as a counter electrode. For these reasons, use of a quaternary ammonium cation realizes a large-output electricity storage device. A lithium cation allows use of a negative electrode, which has a low reaction potential and a large capacity density and is capable of occluding and releasing lithium, as a counter electrode. For these reasons, use of a lithium cation realizes a high voltage, high energy density electricity storage device.

Figure 2:
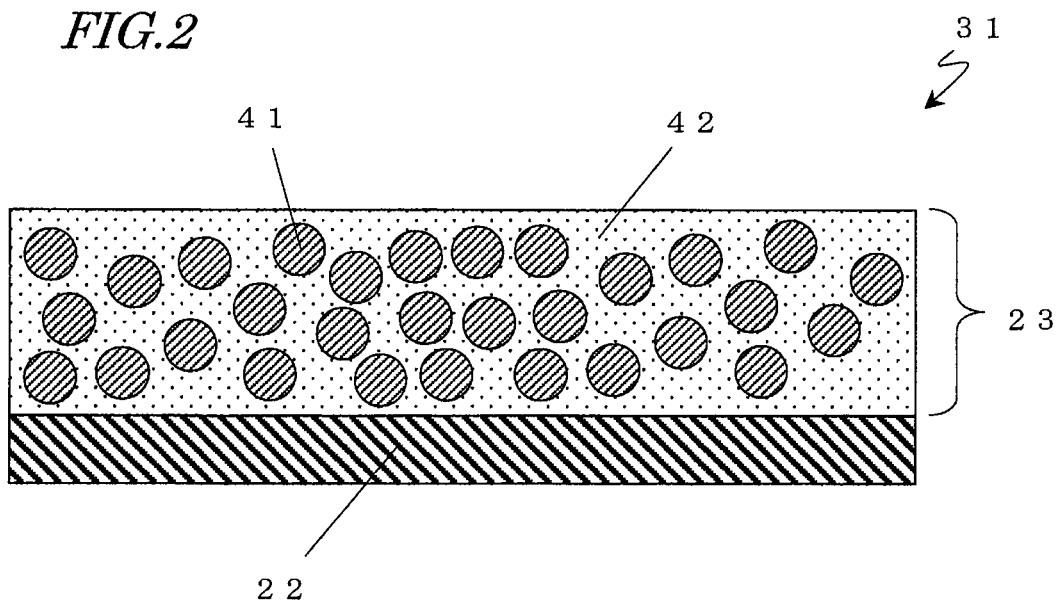
FIG. 2 is a cross-sectional view showing a structure of a positive electrode of the secondary battery in FIG. 1.
Figure 3:
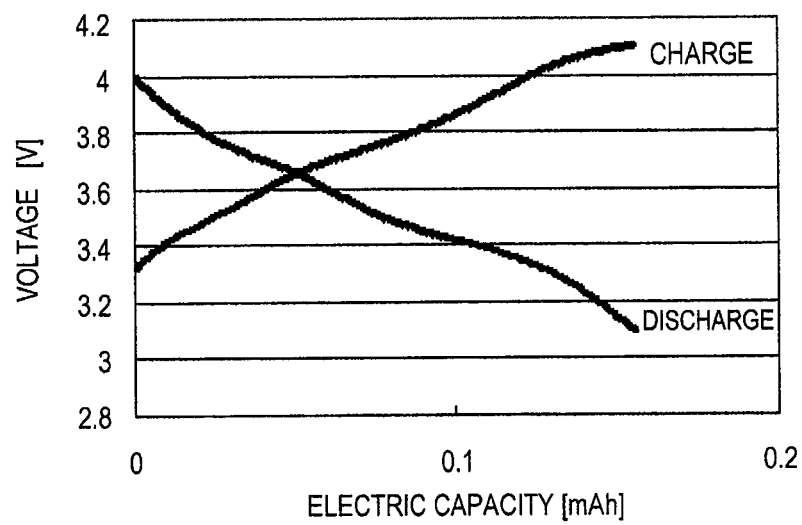
FIG. 3 shows a charge/discharge curve of electricity storage device A in an example.
Figure 4:
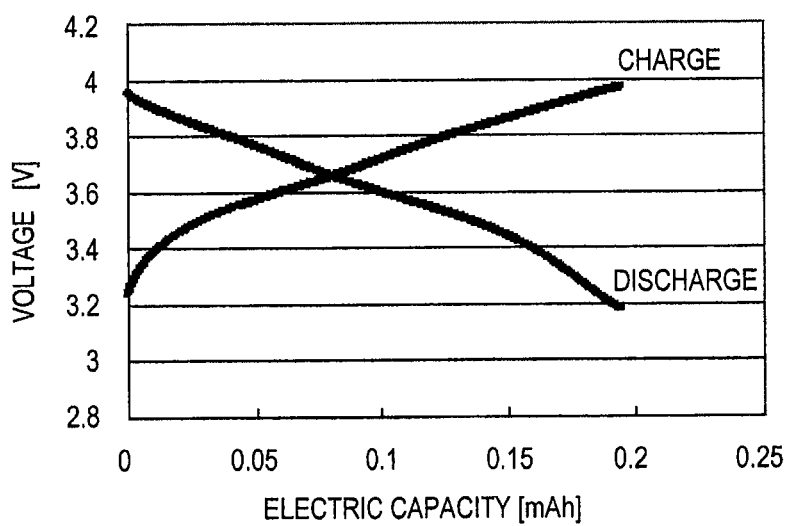
FIG. 4 shows a charge/discharge curve of electricity storage device B in an example.
Figure 5:
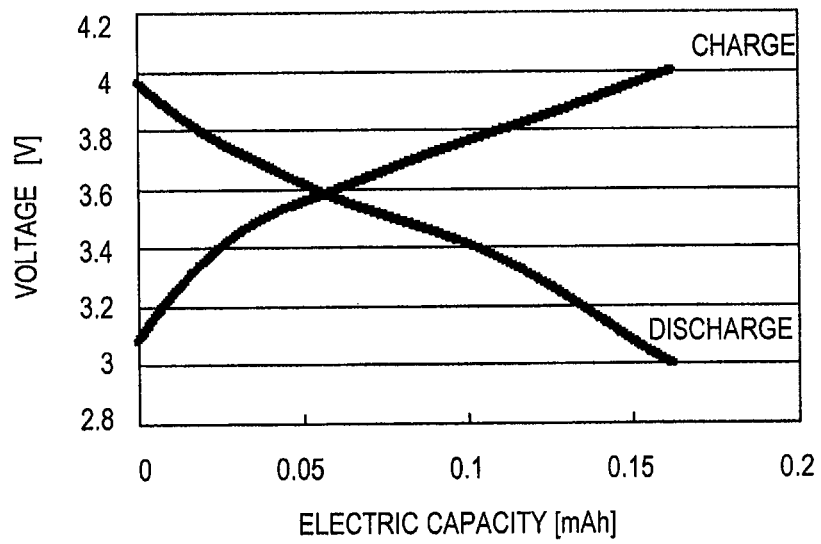
FIG. 5 shows a charge/discharge curve of electricity storage device C in an example.
Figure 6:
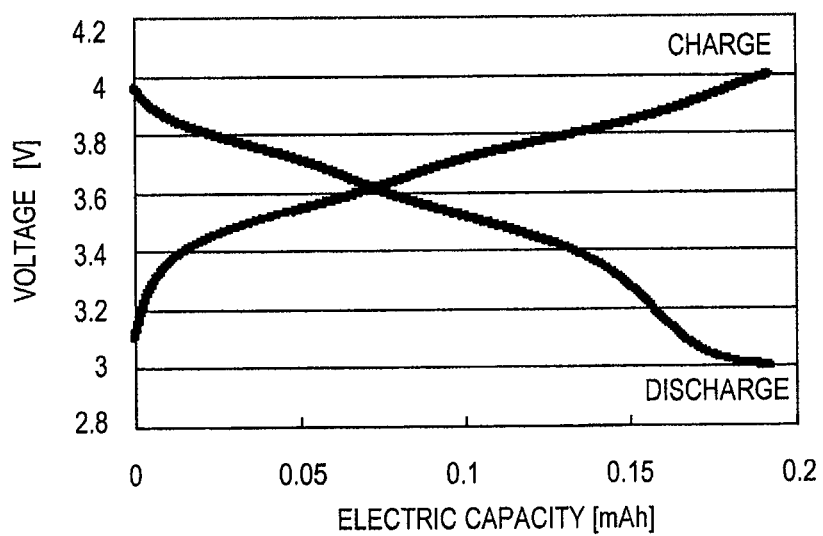
FIG. 6 shows a charge/discharge curve of electricity storage device D in an example.
Figure 7:
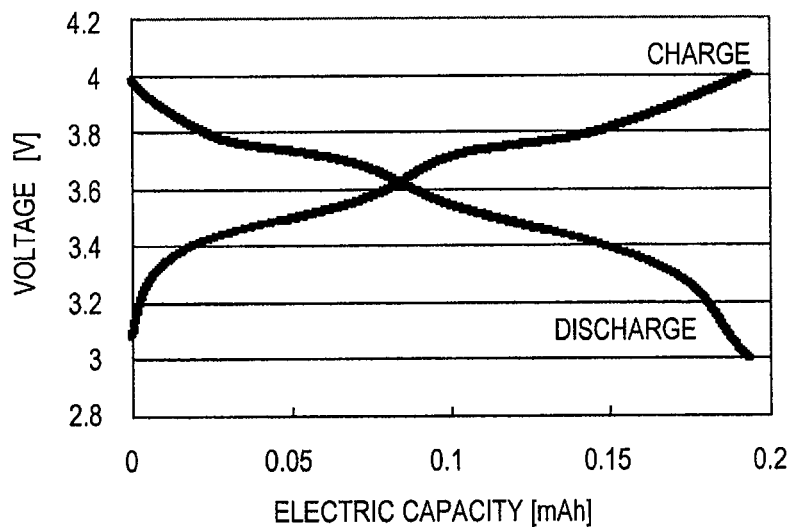
FIG. 7 shows a charge/discharge curve of electricity storage device E in an example.
Figure 8:
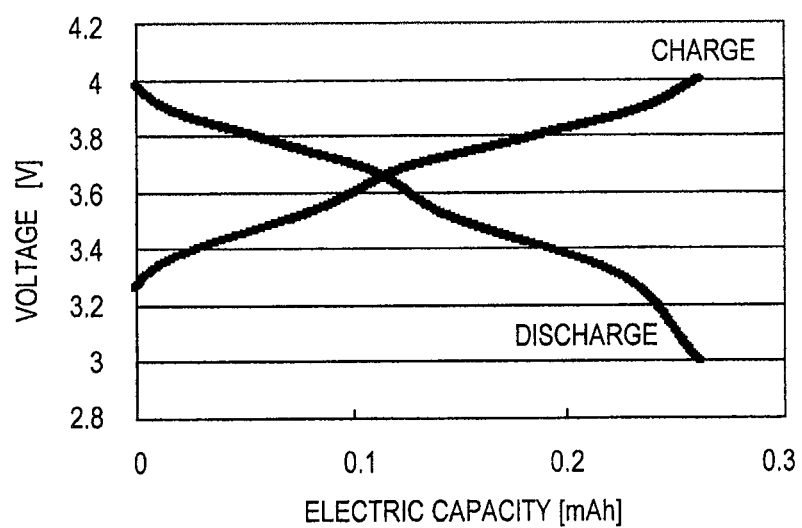
FIG. 8 shows a charge/discharge curve of electricity storage device F in an example.
Figure 9:
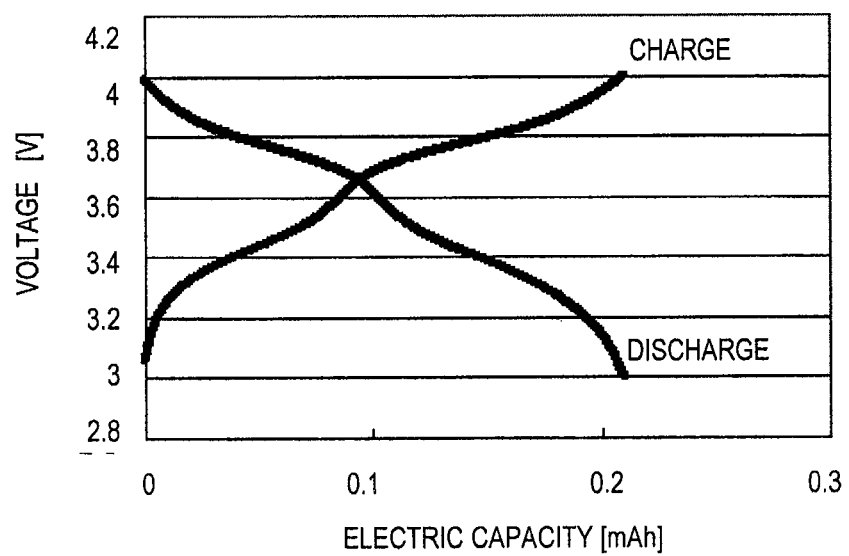
FIG. 9 shows a charge/discharge curve of electricity storage device G in an example.

FIG. 2 is an enlarged cross-sectional view schematically showing a structure of the positive electrode 31. The positive electrode active substance layer 23 supported by the positive electrode current collector 22 contains positive electrode active substance particles 41 and a conductive agent portion 42 formed of a conductor and a binder. The conductive agent portion 42 is porous so as to hold the electrolytic solution 29. In FIG. 2, the positive electrode active substance particles 41 are schematically shown as being circular, but each positive electrode active substance particle 41 has a shape of a chained polymerization product folded and aggregated. By the chained polymerization product being folded, hollow holes are formed and thus the electrolytic solution 29 can enter the inside of the particle. The positive electrode active substance particle 41 has a generally spherical shape, but there is no specific limitation on the shape of the positive electrode active substance particle 41 as long as the shape is formed by the chained polymerization products being aggregated. The size of the positive electrode active substance particle 41 is about 1 μm to 10 μm.

Hereinafter, an electricity storage material used as the positive electrode active substance particles 41 will be described in detail. An electricity storage material according to the present invention is an organic compound which is reversibly oxidation/reduction-reactable, and specifically is a polymerization product having a tetrachalcogenofulvalene structure in a repeat unit of a main chain. The tetrachalcogenofulvalene structure is represented by the following general formula (1).

[Formula 18]

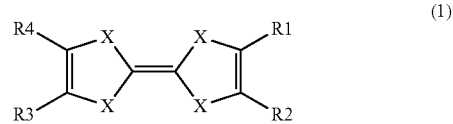

In the formula, X is chalcogen, namely, a group XVI element in the periodic table. Specifically, chalcogen is an oxygen atom, a sulfur atom, a selenium atom or a tellurium atom. Two selected from R1 through R4 each represent a bond with an adjacent tetrachalcogenofulvalene structure represented by general formula (1) or a bond with a monomer having a chemical structure other than the structure represented by general formula (1). The other two of R1 through R4 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom.

The tetrachalcogenofulvalene structure represented by general formula (1) contains, in each of the two five-member rings, a chalcogen atom having an unpaired electron and a double bond. Owing to this, a π-conjugated electron cloud in which the five-member rings are delocalized is formed. Therefore, the tetrachalcogenofulvalene structure can be kept stable even in an oxidized state caused by one π electron being released from each of the two five-member rings.

As represented by the following formula (R1), when the tetrachalcogenofulvalene structure represented by general formula (1) is subjected to one-electron oxidation, an electron is pulled out from one of the two five-member rings and so this five-member ring is charged positive. Therefore, one counter anion coordinates to the tetrachalcogenofulvalene structure. When the tetrachalcogenofulvalene structure is further subjected to one-electron oxidation, an electron is pulled out from the other five-member ring and so this five-member ring is charged positive. Therefore, one more counter anion coordinates to the tetrachalcogenofulvalene structure.

The tetrachalcogenofulvalene structure is stable even in an oxidized state, and can be reduced by receiving an electron and return to an electrically neutral state. Accordingly, by using such a reversible oxidation/reduction reaction, the tetrachalcogenofulvalene structure can be used for an electricity storage material in which charges can be stored. For example, where the tetrachalcogenofulvalene structure represented by general formula (1) is used for a positive electrode of a lithium secondary battery, the tetrachalcogenofulvalene structure is in an electrically neutral state, i.e., in the state shown left in formula (R1), when being discharged. In a charged state, the tetrachalcogenofulvalene structure is in a positively charged state, i.e., in the state shown right in formula (R1).

ization product, the site which is subjected to an oxidation/reduction reaction contributes to the polymerization of the polymerization product. Therefore, a structure of the polymerization product, in which the portion that is not subjected to the oxidation/reduction reaction is as small as possible, can be formed. Owing to this, an electricity storage material having a high energy density and an excellent charge/discharge or oxidation/reduction cycle characteristic can be realized.

As polymerization products having a π-conjugated electron cloud, polyaniline, polythiophene and derivatives thereof are known. These polymerization products are very similar to the polymerization product of an electricity storage material according to the present invention on the point of containing a π-conjugated electron cloud in the main chain. However, in polyaniline, polythiophene and derivatives thereof, a resonance structure by a conjugated double bond is formed in the entirety of the main chain. Therefore, when an electron is pulled out from the main chain, the positive charge generated by this is distributed in an area expanded to a certain degree in the main chain. As a result, when it is attempted to pull out another electron successively from an adjacent repeat unit, the positive charge generated by the first electron being pulled out is delocalized over the adjacent repeat unit, which makes it difficult to pull the electron from the adjacent unit due to an electric repulsion.

By contrast, in the case of the polymerization product having the tetrachalcogenofulvalene structure represented by general formula (1), electrons are delocalized only in each five-member ring of the π-conjugated electron cloud. Therefore, the oxidation/reduction reaction is completed within each five-member ring of the polymerization product. It is considered that an oxidized state of one five-member ring does not significantly influence the oxidation/reduction reaction of a five-member ring adjacent thereto. For this reason, electrons can be transferred in correspondence with the number of five-member rings contained in the polymerization product. Namely, the electricity storage material according to the present invention can achieve a large electricity storage capacity.

As described above, it is preferable that the molecular weight of the polymerization product having the tetrachalco-

[Formula 19]

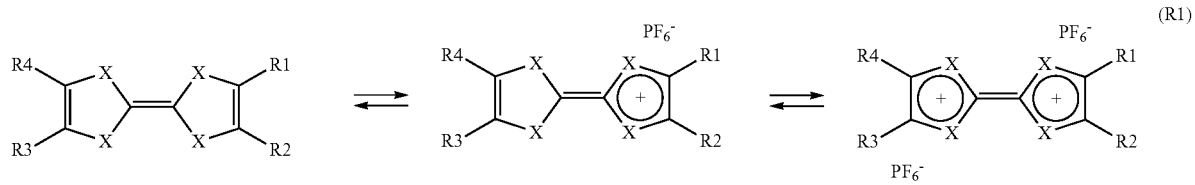

(R1)

An electricity storage material according to the present invention contains the tetrachalcogenofulvalene structure represented by general formula (1) in a repeat unit of the main chain of the polymerization product. As a result of the tetrachalcogenofulvalene structure represented by general formula (1) being progressively polymerized, the molecular weight of a molecule containing the tetrachalcogenofulvalene structure increases, and thus the solubility thereof in an organic solvent decreases. Therefore, the deterioration of the cycle characteristic of an electricity storage device which uses an organic solvent for an electrolytic solution can be suppressed. Especially by the tetrachalcogenofulvalene structure being contained in the main chain of the polymergenofulvalene structure represented by general formula (1) is as large as possible so that the polymerization product is not dissolved in an organic solvent. Specifically, it is preferable that the polymerization product contains four or more tetrachalcogenofulvalene structures represented by general formula (1); namely, the degree of polymerization of the polymerization product (n, or a sum of n and m, in the following general formula or chemical formula) is 4 or greater. Owing to this, an electricity storage material which is difficult to be dissolved in an organic solvent is realized. More preferably, the degree of polymerization of the polymerization product is 10 or greater, and still more preferably, is 20 or greater.

The polymerization product having the tetrachalcogenofulvalene structure may be a copolymerization product of a monomer having the tetrachalcogenofulvalene structure represented by general formula (1) and a monomer having a chemical structure other than the structure represented by general formula (1), as long as the polymerization product contains the tetrachalcogenofulvalene structure represented by general formula (1). It should be noted that in order to provide a higher energy density, it is preferable that tetrachalcogenofulvalene structures are directly bonded together to form the main chain of the polymerization product. In this case, for example, the polymerization product may be a copolymerization product of two or more monomers, each of which contains a tetrachalcogenofulvalene structure represented by general formula (1), but the groups of the tetrachalcogenofulvalene structure, among R1 through R4, which are not used for the bond with an adjacent tetrachalcogenofulvalene structure need to be different among the monomers. In other words, the polymerization product may be a copolymerization product of two or more monomers which all contain a tetrachalcogenofulvalene structure but are different in terms of the substituent.

Hereinafter, a polymerization product of an electricity storage material according to the present invention will be described more specifically.

First, a polymerization product represented by the following general formula (2), in which R1 and R3 of the tetrachalcogenofulvalene structure represented by general formula (1), i.e., position 1 and position 4 of the tetrachalcogenofulvalene structure, are bonded with position and position 1 of adjacent tetrachalcogenofulvalene structures, is usable for an electricity storage material according to the present invention. In a polymerization product represented by general formula (2), the tetrachalcogenofulvalene structures are directly bonded to each other to form the main chain of the polymerization product. Therefore, the ratio of portions which contribute to the oxidation/reduction reaction with respect to the entire main chain is high, and thus the obtained electricity storage material can accumulate charges at a high energy density.

[Formula 20]

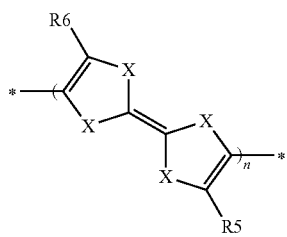

(2)

In general formula (2), X is an oxygen atom, a sulfur atom, a selenium atom or a tellurium atom. R5 and R6 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom; namely, may contain an oxygen atom, a nitrogen atom, a sulfur atom or a silicon atom in addition to the carbon atom. n represents the degree of polymerization and is an integer of 2 or greater (this is also applied to the general formulas and the chemical formulas shown below).

X is preferably a sulfur atom, and R5 and R6 are preferably a chained hydrocarbon group or an aromatic group. Where X is a sulfur atom, as compared with the case where X is a selenium atom or a tellurium atom, the atomic weight is smaller and so the energy density per weight is larger. Again, where X is a sulfur atom, as compared to the case where X is an oxygen atom, the oxidation/reduction potential is higher and so the discharge voltage can be higher when such a polymerization product is used as a positive electrode material. For example, an electricity storage material according to the present invention is represented by any of chemical formulas (21) through (24) in which X=S and R5 and R6 are each $C_6H_{13}$, $C_{10}H_{21}$, $C_8H_{17}$ or $C_6H_5$.

[Formula 21]

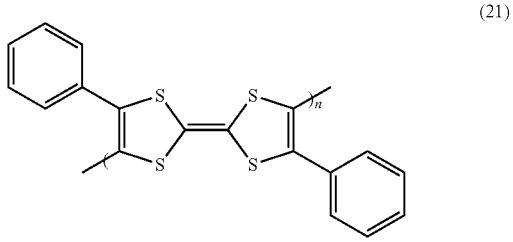

(21)

[Formula 22]

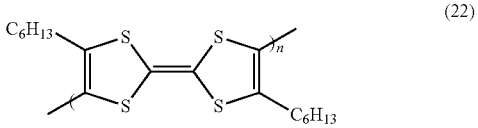

(22)

[Formula 23]

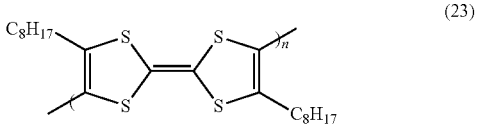

(23)

[Formula 24]

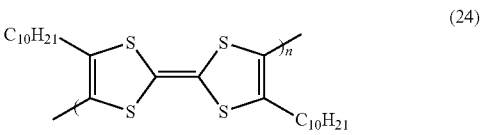

(24)

An electricity storage material according to the present invention may be a copolymerization product containing repeat units represented by the following general formulas (3) and (4). In both of the polymerization products represented by general formulas (3) and (4), positions 1 and 4 of the tetrachalcogenofulvalene structure are directly bonded to positions 4 and 1 of adjacent tetrachalcogenofulvalene structures, but the tetrachalcogenofulvalene structures in the repeat units of these polymerization products have different substituents. In a copolymerization product containing the repeat units represented by general formulas (3) and (4) also, the tetrachalcogenofulvalene structures are directly bonded to each other to form the main chain of the copolymerization product. Therefore, the ratio of portions which contribute to the oxidation/reduction reaction with respect to the entire main chain is high, and thus the obtained electricity storage material can accumulate charges at a high energy density.

[Formula 25]

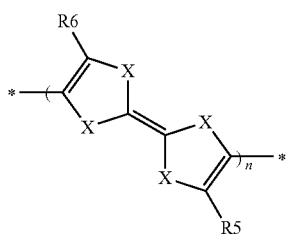
(3)

[Formula 26]

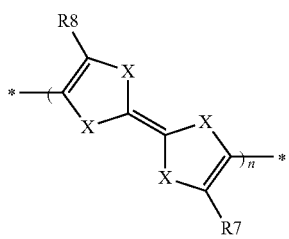
(4)

In general formulas (3) and (4), X is an oxygen atom, a sulfur atom, a selenium atom or a tellurium atom. R5 through R8 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom. It should be noted that a combination of R5 and R6 is different from a combination of R7 and R8.

For example, R5 and R6 may each be a phenyl group, whereas R7 and R8 may each be a chained hydrocarbon group. The chained hydrocarbon group may be a polymerization product represented by the following chemical formula (25), which is a decyl group. In the chemical formula, a sum of n and m represents the degree of polymerization and is an integer of 2 or greater. The two repeat units each having a tetrachalcogenofulvalene structure may be arranged regularly or randomly. The ratio of n and m is arbitrary. It is preferable that the molecular weight of the polymerization product is as large as possible so that the polymerization product is not dissolved in an organic solvent. Specifically, it is preferable that the polymerization product contains four or more tetrachalcogenofulvalene structures; namely, the degree of polymerization of the polymerization product (sum of n and m) is 4 or greater.

[Formula 27]

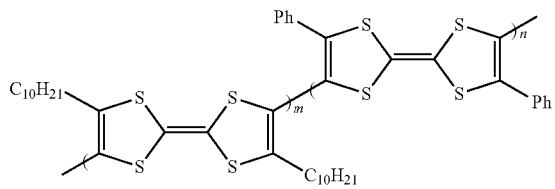
(25)

An electricity storage material according to the present invention may be a polymerization product represented by the following general formula (5). Such a polymerization product has a main chain in which chained unsaturated hydrocarbon groups or cyclic unsaturated hydrocarbon groups each containing an acetylene structure as a linker are alternately arranged with the tetrachalcogenofulvalene structures. In a polymerization product represented by general formula (5), the tetrachalcogenofulvalene structures form the main chain with the chained unsaturated hydrocarbon groups or cyclic unsaturated hydrocarbon groups each containing an acetylene structure being sandwiched between the tetrachalcogenofulvalene structures. Therefore, the chained unsaturated hydrocarbon groups or cyclic unsaturated hydrocarbon groups each containing an acetylene structure suppress an electronic mutual interaction between the tetrachalcogenofulvalene structures and thus can improve the stability of each tetrachalcogenofulvalene structure against the electrochemical oxidation/reduction reaction. As a result, all the tetrachalcogenofulvalene structures in the polymerization product can be reversibly oxidized/reduced, which can realize a large capacity electricity storage body.

[Formula 28]

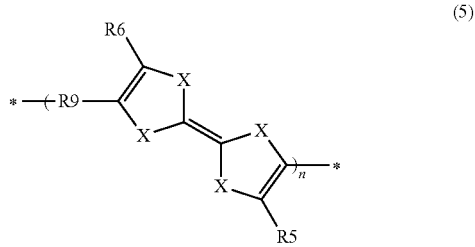
(5)

In general formula (5), X is an oxygen atom, a sulfur atom, a selenium atom or a tellurium atom. R5 and R6 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom. R9 is a chained unsaturated hydrocarbon group or a cyclic unsaturated hydrocarbon group each containing an acetylene structure, and contains at least one selected from the group consisting of a carbon atom, an oxygen atom, a nitrogen atom, a sulfur atom and a silicon atom.

For example, the electricity storage material may be a polymerization product represented by the following chemical formula (26), in which X is a sulfur atom, R5 and R6 are each a phenyl group, and R9 has a structure represented by the following chemical formula (6).

[Formula 29]

(6)

-continued

[Formula 30]

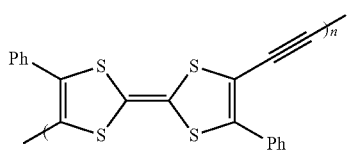

(26)

An electricity storage material according to the present invention may be a polymerization product represented by the following general formula (7). Such a polymerization product has a main chain in which chained unsaturated hydrocarbon groups or cyclic unsaturated hydrocarbon groups each containing a thiophene structure as a linker are alternately arranged with the tetrachalcogenofulvalene structures. In a polymerization product represented by general formula (7) also, the tetrachalcogenofulvalene structures form the main chain with the chained unsaturated hydrocarbon groups or cyclic unsaturated hydrocarbon groups each containing a thiophene structure being sandwiched between the tetrachalcogenofulvalene structures. Therefore, the chained unsaturated hydrocarbon groups or cyclic unsaturated hydrocarbon groups each containing a thiophene structure suppress an electronic mutual interaction between the tetrachalcogenofulvalene structures and thus can improve the electrochemical stability of each tetrachalcogenofulvalene structure against the oxidation/reduction reaction. As a result, all the tetrachalcogenofulvalene structures in the polymerization product can be reversibly oxidized/reduced, which can realize a large capacity electricity storage body.

[Formula 31]

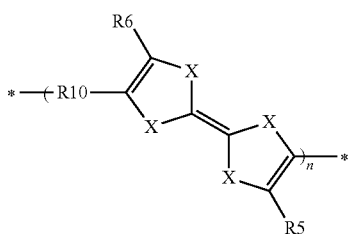

(7)

In general formula (7), X is an oxygen atom, a sulfur atom, a selenium atom or a tellurium atom. R5 and R6 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group may each contain at least one selected from the group consisting of a carbon atom, an oxygen atom, a nitrogen atom, a sulfur atom and a silicon atom. R10 is a chained unsaturated hydrocarbon group or a cyclic unsaturated hydrocarbon group each containing a thiophene structure, and contains at least one selected from the group consisting of a carbon atom, an oxygen atom, a nitrogen atom, a sulfur atom and a silicon atom.

For example, X may be a sulfur atom, R5 and R6 may each be a phenyl group or a chained hydrocarbon group, and R10 may have a structure represented by any of the following chemical formulas (8) through (12).

[Formula 32]

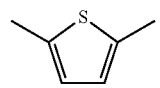

(8)

[Formula 33]

(9)

[Formula 34]

(10)

[Formula 35]

(11)

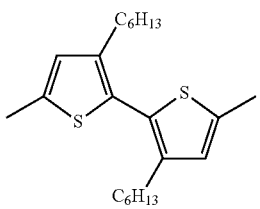

[Formula 36]

(12)

More specifically, an electricity storage material according to the present invention may be a polymerization product represented by any of the following chemical formulas (27) through (32). It is preferable that the polymerization product contains four or more tetrachalcogenofulvalene structures so that the polymerization product is not dissolved in an organic solvent. Namely, it is preferable that n in chemical formulas (27) through (31) is 4 or greater and that m in chemical formula (32) is 4 or greater. In a polymerization product represented by chemical formula (32), the repeat unit having the tetrachalcogenofulvalene structure and the repeat unit having the thiophene structure may be arranged regularly or randomly. The ratio of n and m is arbitrary.

[Formula 37]

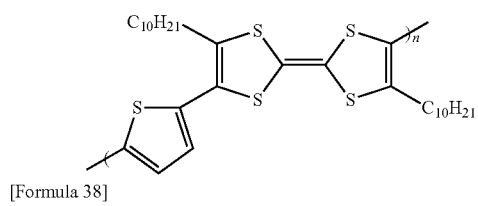

(27)

[Formula 38]

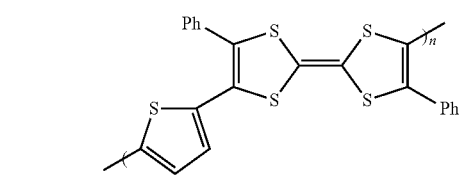

(28)

[Formula 39]

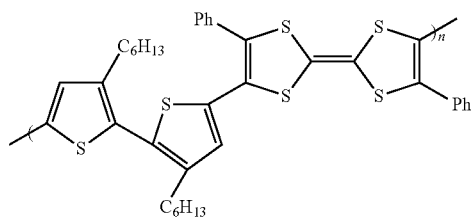

(29)

[Formula 40]

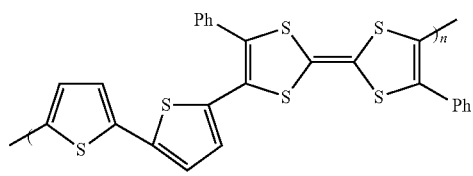

(30)

[Formula 41]

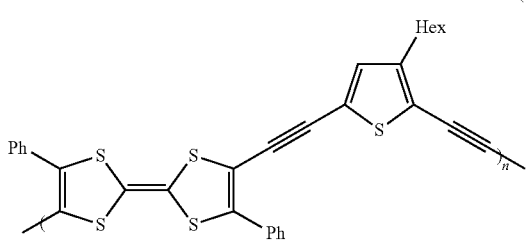

(31)

[Formula 42]

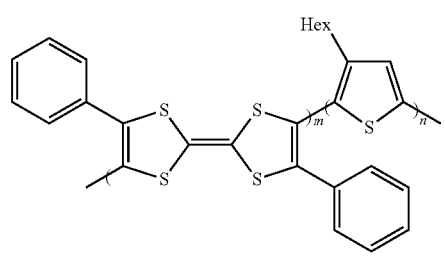

(32)

An electricity storage material according to the present invention may be a polymerization product represented by the following general formula (13). In such a polymerization product, the main chain has a zigzag structure because the tetrachalcogenofulvalene structures are alternately polymerized at a cis position and a trans position.

[Formula 43]

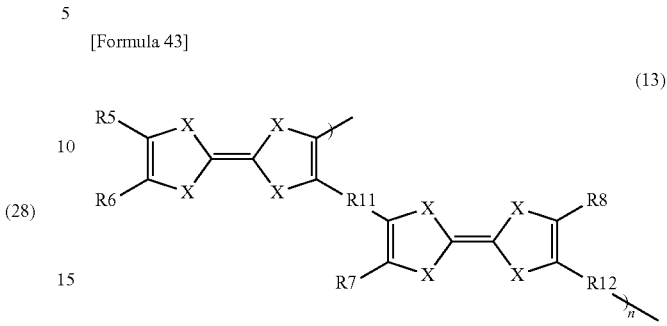

(13)

In general formula (13), X is an oxygen atom, a sulfur atom, a selenium atom or a tellurium atom. R5 through R8 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom.

R11 and R12 are each independently a chained unsaturated hydrocarbon group or a cyclic unsaturated hydrocarbon group each containing at least one of an acetylene structure or a thiophene structure, and contains at least one selected from the group consisting of a carbon atom, an oxygen atom, a nitrogen atom, a sulfur atom and a silicon atom.

For example, the electricity storage material may be a polymerization product represented by the following chemical formula (33), in which X is a sulfur atom, R5 and R6 are each a thiohexyl group, R7 and R8 are each a phenyl group, and R11 and R12 each have a structure represented by the following chemical formula (14). It is preferable that the polymerization product contains four or more tetrachalcogenofulvalene structures so that the polymerization product is not dissolved in an organic solvent. Namely, it is preferable that n in chemical formula (33) is 2 or greater.

[Formula 44]

$$\equiv$$

(14)

[Formula 45]

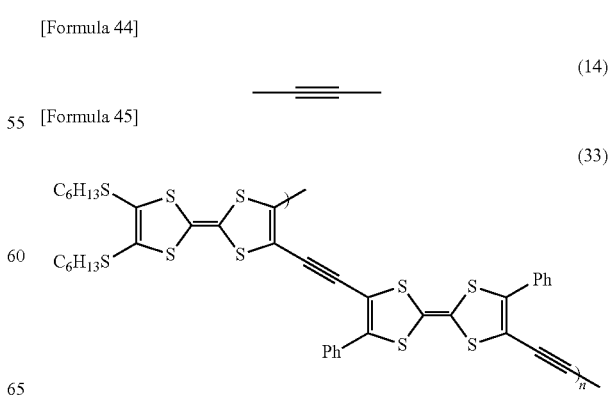

(33)

An electricity storage material according to the present invention may be a polymerization product represented by the following general formula (15).

[Formula 46]

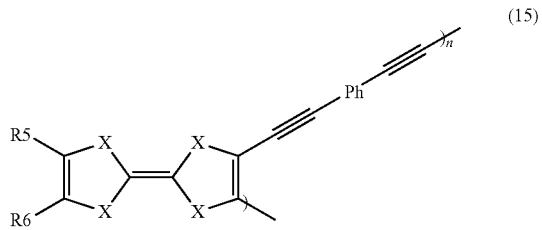

(15)

In general formula (15), Ph is a bivalent aromatic hydrocarbon group. X is an oxygen atom, a sulfur atom, a selenium atom or a tellurium atom. R5 through R8 each independently contain at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom.

More specifically, an electricity storage material according to the present invention may be a polymerization product represented by the following general formula (16).

[Formula 47]

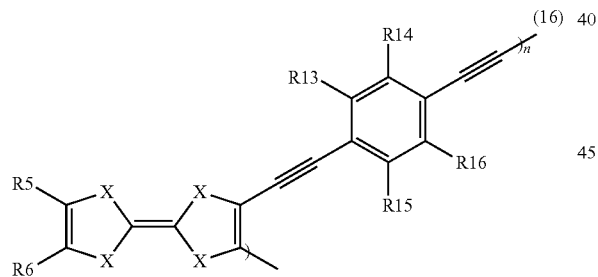

(16)

In general formula (16), X is an oxygen atom, a sulfur atom, a selenium atom or a tellurium atom. R5, R6, and R13 through R16 each independently contain at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom.

For example, the electricity storage material may be a polymerization product represented by the following chemical formula (34), in which X is a sulfur atom, R5 and R6 are each a thioalkyl group, and R13 through R16 are each a hydrogen atom.

[Formula 48]

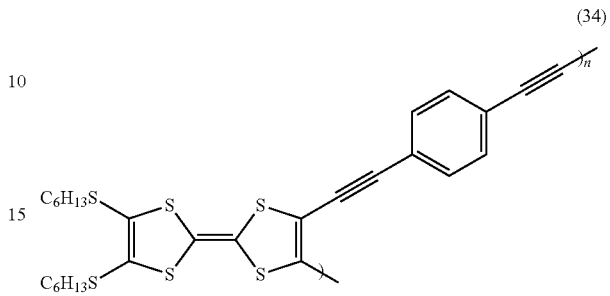

(34)

Alternatively, an electricity storage material according to the present invention may be a polymerization product represented by the following general formula (17).

[Formula 49]

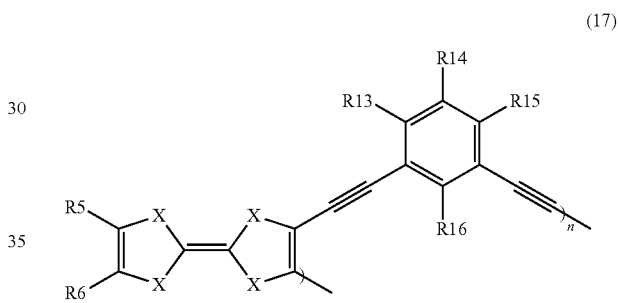

(17)

In general formula (17), X is an oxygen atom, a sulfur atom, a selenium atom or a tellurium atom. R5, R6, and R13 through R16 each independently contain at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group. The chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom.

In a polymerization product represented by each of general formulas (15) through (17) also, the tetrachalcogenofulvalene structures form the main chain with the chained unsaturated hydrocarbon groups containing an acetylene structure or a benzene structure being sandwiched between the tetrachalcogenofulvalene structures. Therefore, the chained unsaturated hydrocarbon groups suppress an electronic mutual interaction between the tetrachalcogenofulvalene structures and thus can improve the electrochemical stability of each tetrachalcogenofulvalene structure against the oxidation/reduction reaction. As a result, all the tetrachalcogenofulvalene structures in the polymerization product can be reversibly oxidized/reduced, which can realize a large capacity electricity storage body.

Each of the above-described polymerization products usable for an electricity storage material according to the present invention can be synthesized by polymerizing monomers containing a repeat unit represented by general formula (1). The synthesis can be done by any method as long as the polymerization product has the structure represented by any of general formula (2) through (17) shown above. However, in order to prevent the dislocation of active bonding hands in the polymerization product and form a polymerization product having a high level of regularity, it is preferable that the polymerization product is synthesized by polymerization by a coupling reaction. Specifically, the polymerization product is preferably synthesized as follows. Monomers are prepared, each of which contains a tetrachalcogenofulvalene structure having the molecular structure containing a prescribed substituent as represented by any of general formulas (2) through (17) shown above and has halogen or any other functional group at a position acting as a bonding hand at the time of polymerization. Such monomers are polymerized by a Sonogashira coupling reaction or any other coupling reaction.

More specifically, the compounds represented by chemical formulas (21) through (34) listed above as examples of a polymerization product usable for an electricity storage material according to the present invention can each be synthesized by any of the following four methods. Hereinafter, the compounds represented by chemical formulas (21) through (34) will respectively be referred to as "compound 21 through compound 34".

Compounds 21 through 25 are polymerization products in which the tetrachalcogenofulvalene structures are directly bonded to each other. As represented by the following reaction formula (R2), these compounds can be synthesized by a dehalogenation polycondensation method using diiodide of tetrachalcogenofulvalene and Ni(O) complex. In the reaction formula, X represents a sulfur or oxygen atom, cod represents 1,5-cyclooctadiene, and bpy represents 2,2'-bipyridine.

[Formula 50]

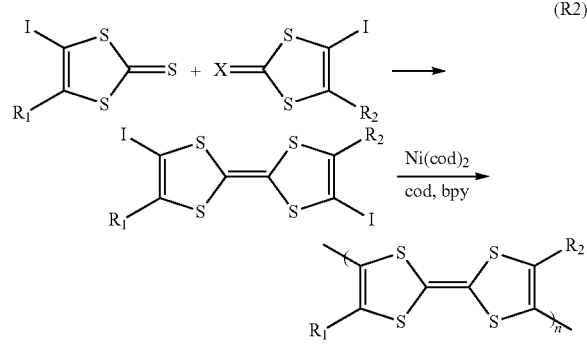

Compounds 27 through 30 and 32 are polymerization products in which tetrachalcogenofulvalene structures are bonded to each other with at least a thiophene structure sandwiched therebetween. As represented by the following reaction formula (R3), these compounds can be synthesized by a still coupling reaction from trimethylstannyl of tetrachalcogenofulvalene and iodide of a thiophene structure using a Pd catalyst. Alternatively, these compounds can be synthesized by a still coupling reaction from iodide of tetrachalcogenofulvalene and trimethylstannyl of a thiophene structure in a similar manner. A polymerization product obtained by this reaction has a hydrogen atom or a halogen element derived from a compound used as a starting material, at both ends thereof.

[Formula 51]

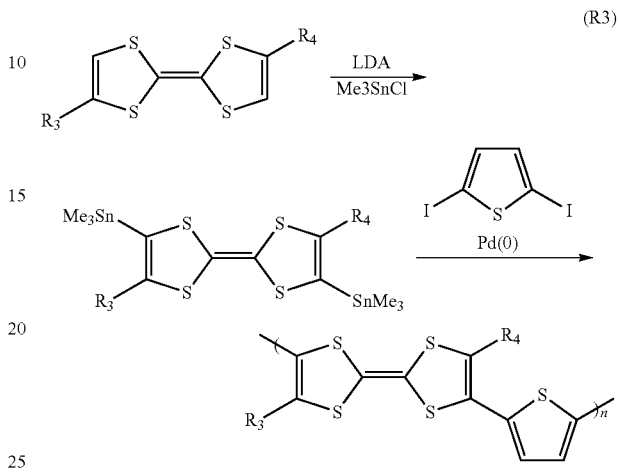

Compounds 31 and 34 are polymerization products in which tetrachalcogenofulvalene structures are bonded to each other with triple bond/aromatic/triple bond sandwiched therebetween. As represented by the following reaction formula (R4), these compounds can be synthesized by a Sonogashira reaction of diiodide of tetrachalcogenofulvalene and a compound having a triple bond position. As understood from reaction formula R4, any compound having a triple bond position with no specific limitation can bond the tetrachalcogenofulvalene structures to each other. Although the linker site contains a thiophene structure in reaction formula R4, the linker site only needs to be aromatic. For example, the linker site may contain a benzene ring. Even in this case, a polymerization product in which the tetrachalcogenofulvalene structures are bonded to each other with triple bond/aromatic/triple bond sandwiched therebetween can be synthesized by substantially the same reaction. A polymerization product obtained by this reaction has a hydrogen atom or a halogen element derived from a compound used as a starting material, at both ends thereof.

[Formula 52]

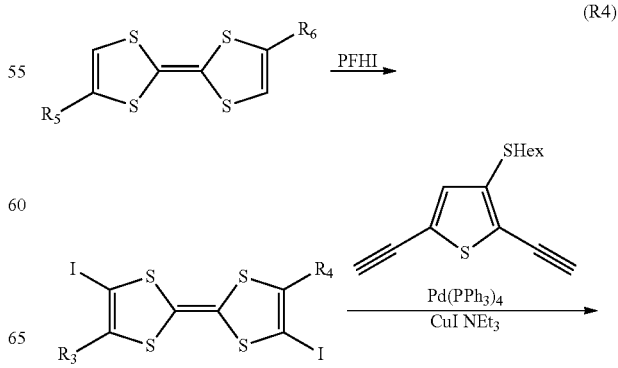

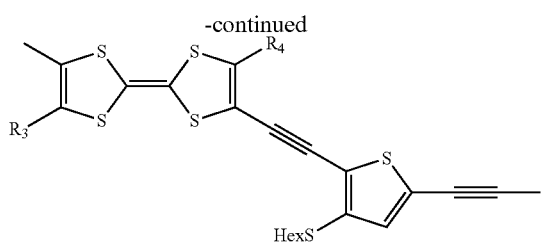

Compounds 26 and 33 are polymerization products in which tetrachalcogenofulvalene structures are bonded to each other with only a triple bond sandwiched therebetween. As represented by the following reaction formula (R5), these compounds can be synthesized by a Sonogashira reaction of diiodide of tetrachalcogenofulvalene and a compound having a triple bond position. A polymerization product obtained by this reaction has a hydrogen atom or a halogen element derived from a compound used as a starting material, at both ends thereof.

[Formula 53]

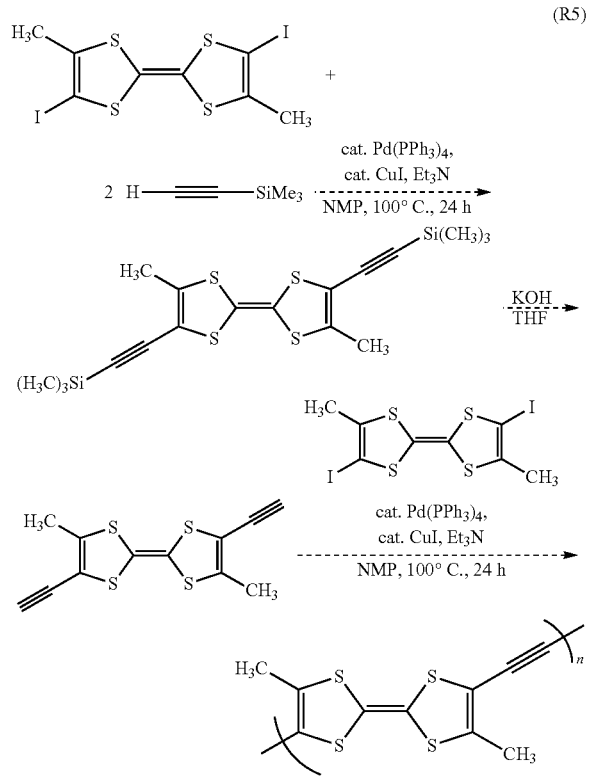

The above-described synthesis methods of compounds 21, 26, 31 and 32 are described in, for example, J. mater. chem., 1967, 7(10), 1997. The above-described synthesis methods of compounds 22, 23 and 24 are described in, for example, Mol. Cryst. Liq., Vol. 381, 101-112, 2002.

The synthesis methods of compounds 23, 25, 27 through 30 and 34 will be described in detail in the examples below.

As described above, an electricity storage device according to the present invention contains an electricity storage material which has a tetrachalcogenofulvalene structure in a repeat unit of a main chain. Therefore, the electricity storage material is formed of an organic compound, but has a large molecular weight and is low in the solubility in an organic solvent. Owing to this, the electricity storage material can suppress the deterioration of the cycle characteristic of an electricity storage device which uses an organic solvent for the electrolytic solution. Since the tetrachalcogenofulvalene structure is contained in the main chain of the polymerization product, the site which is subjected to an oxidation/reduction reaction contributes to the polymerization of the polymerization product. Therefore, a structure of the polymerization product, in which a portion that is not subjected to the oxidation/reduction reaction is as small as possible, can be formed. Owing to this, an electricity storage material having a high energy density and an excellent charge/discharge or oxidation/reduction cycle characteristic can be realized. Because of these features, an electricity storage device according to the present invention is preferably usable for vehicles such as hybrid automobiles and mobile electronic devices. When used in the vehicles and mobile electronic devices, an electricity storage device according to the present invention has features of being lightweight, having a large output, and having a long cycle life. Therefore, devices including an electricity storage material according to the present invention can be lightweight, which is difficult to be realized with a conventional electricity storage device using an inorganic compound.

In this embodiment, an electricity storage material according to the present invention is used in an electricity storage device, more specifically, a lithium secondary battery. As described above, the electricity storage material according to the present invention is also preferably usable for devices other than secondary batteries, for example, electric double layer capacitors, electrochemical devices such as biochips using a biochemical reaction, and electrodes for electrochemical devices.

An electrode formed of an electricity storage material described above can be produced by any of three methods of a dry method, a wet method and a gas phase method. First, a method of producing an electrode by the dry method will be described. According to the dry method, a polymerization product represented by any of general formulas (2) through (17) and a binder are mixed together, and the obtained paste is pressure-contacted on a conductive support. Thus, an electrode having a film-like electricity storage material pressure-contacted on the conductive support is obtained. The film may be either a fine film or a porous film, but a film produced by the dry method is generally a fine film.

Examples of materials usable as the binder include fluorine-based resins such as poly(vinylidene fluoride), vinylidene fluoride-hexafluoropropylene copolymerization product, vinylidene fluoride-polytetrafluoroethylene and the like; and hydrocarbon-based resins such as polyethylene, polyimide, polyacrylic resin, cellulose-based resins and the like. From the viewpoint of stability, fluorine-based resins are preferably usable.

Examples of materials usable as the conductive support include metal substrates of Al, SUS, gold, silver and the like; semiconductor substrates of Si, GaAs, GaN and the like; transparent conductive substrates of ITO glass, $SnO_2$ and the like; carbon substrates of carbon, graphite and the like; and conductive organic substrates of polyaniline, polypyrrole, polythiophene and the like.

The conductive support may be an independent fine film or an independent porous film such as a mesh or a net, each of which is formed of any of the above-described materials. Alternatively, the conductive support may be a film of any of the above-described conductive support materials formed on a non-conductive support of plastic or glass. Optionally, in addition to the polymerization product and the binder, a conduction assisting agent, for example, may be mixed in order to improve the electron conductivity in the film. Examples of materials usable as the conduction assisting agent include carbon materials such as carbon black, graphite, acetylene black and the like; and conductive polymerization products such as polyaniline, polypyrrole, polythiophene and the like. In the film, a solid electrolyte formed of polyethylene oxide or the like, or a gel electrolyte formed of poly(methyl methacrylate) or the like may be contained as an ion-conductive assisting agent.

Now, a method of producing an electrode by the wet method will be described. According to the wet method, a polymerization product represented by any of general formulas (2) through (17) is mixed in, and thus dispersed in, a solvent; the obtained slurry is applied or printed on a conductive support; and the solvent is removed to form a film. Optionally, a conduction assisting agent, a binder or an ion-conductive assisting agent may be mixed in the electrode film like in the case of the dry method. As the conductive support, substantially the same materials as those described above regarding the dry method are usable.

Finally, a method for producing an electrode by the gas phase method will be described. According to the gas phase method, a polymerization product represented by any of general formulas (2) through (17) is gasified in vacuum, and the gas-state polymerization product is deposited on a conductive support and is formed into a film. Suitable film forming methods usable in this method are general vacuum film formation processes such as vacuum vapor deposition, sputtering, CVD and the like. Optionally, a conduction assisting agent, a binder or an ion-conductive assisting agent may be mixed in the electrode film like in the case of the dry method. As the conductive support, substantially the same materials as those described above regarding the dry method are usable.

Hereinafter, examples of synthesizing electricity storage materials according to the present invention, examples of producing electricity storage devices according to the present invention, and evaluation results of the characteristics thereof will be described.

Example 1

First, examples of synthesizing electricity storage materials according to the present invention will be described.

1. Synthesis of Compound 23

Compound 23 was synthesized in accordance with reaction formula (R7) shown below.

[Formula 54]

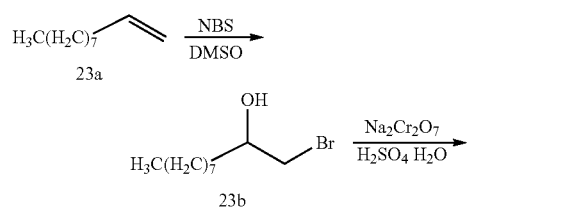

(R7)

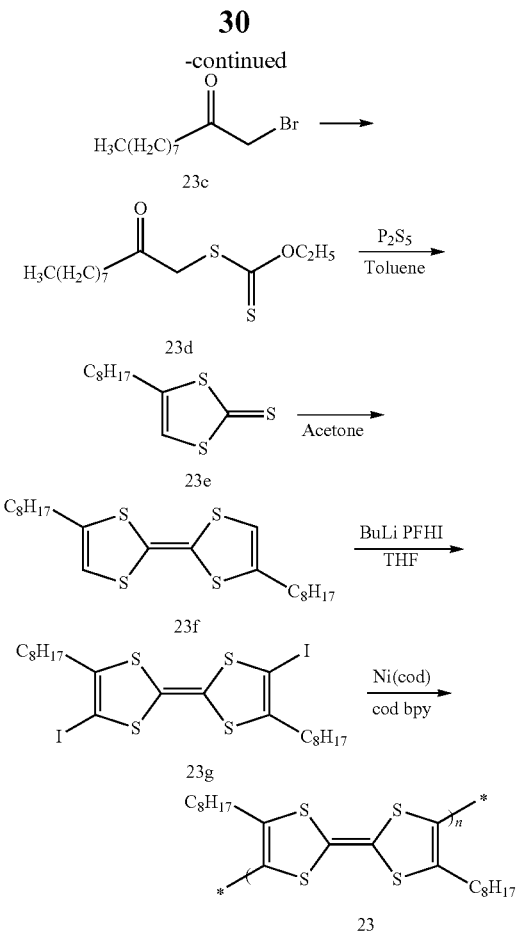

1.1 Synthesis of Compound 23b

Decane-1-ene (compound 23a; 126.4 g, 0.09 mol) was put into a 2000 ml eggplant-shaped flask, and DMSO (1500 ml), distilled water (88 ml) and NBS (320 g, 1.8 mol) were added thereto. These substances were stirred for 4 hours. Then, extraction was caused with ether, the extracted substance was dried, and the solvent was removed. The obtained sample was purified by column chromatography using silica gel. As a result, a colorless transparent liquid was obtained. The yield was 98%.

As a result of an H-NMR (CDCl$_3$) measurement, chemical shifts were observed in the vicinity of δ3.76, 3.41, 2.20, 1.58-1.29, and 0.89 ppm. As a result of an IR (NaCl liquid film method) measurement, peaks were observed at 3400, 2924, 2854, and 1028 cm$^{-1}$. The results of the element analysis were as follows. The theoretical values were: carbon: 50.64 wt. %, hydrogen: 8.92 wt. %, bromine: 33.69 wt. %; whereas the experimental values were: carbon: 50.46 wt. %, hydrogen: 9.06 wt. %, bromine: 33.58 wt. %. It was confirmed from the above results that the obtained liquid was compound 23b.

1.2 Synthesis of Compound 23c

Compound 23b (210 g, 860 mmol) was put into a 2000 ml eggplant-shaped flask and dissolved in acetone (900 ml). Sulfuric acid (160 ml) and sodium dichromate dihydrate (260 g, 880 mmol) were dissolved in distilled water (900 ml), and the resultant substance was put into the eggplant-shaped flask. These substances were stirred for 1.5 hours. Then, ether was added, and these substances were stirred for another hour.

Extraction was caused with ether, the extracted substance was dried, and the solvent was removed. The obtained sample was purified by column chromatography using silica gel. As a result, a white solid was obtained. The yield was 92%.

As a result of an H-NMR (CDCl$_3$) measurement, chemical shifts were observed in the vicinity of δ3.93, 2.65, 1.65-1.29, and 0.88 ppm. As a result of an IR (NaCl liquid film method) measurement, peaks were observed at 2926, 2854, 1718, and 1066 cm$^{-1}$. The results of the element analysis were as follows. The theoretical values were: carbon: 51.07 wt. %, hydrogen: 8.14 wt. %, bromine: 33.98 wt. %; whereas the experimental values were: carbon: 50.23 wt. %, hydrogen: 7.67 wt. %, bromine: 34.59 wt. %. It was confirmed from the above results that the obtained white solid was compound 23c.

1.3 Synthesis of Compound 23d

Acetone (1400 ml) was put into a 2000 ml eggplant-shaped flask, compound 23c (150 g, 620 mmol) was added thereto, and these substances were heated to 50° C. Potassium xanthogenate (100 g, 620 mmol) was added little by little, and these substances were refluxed for 4 hours. Then, the reaction solution was injected into distilled water. Extraction was caused with ether, the extracted substance was dried, and the solvent was removed. As a result, a yellow transparent liquid was obtained. The yield was 77%.

As a result of an H-NMR (CDCl$_3$) measurement, chemical shifts were observed in the vicinity of δ4.63, 3.99, 2.59, 1.66-1.23, and 0.88 ppm. As a result of an IR (NaCl liquid film method) measurement, peaks were observed at 2926, 2854, 1719, and 1049 cm$^{-1}$. The results of the element analysis were as follows. The theoretical values were: carbon: 56.48 wt. %, hydrogen: 8.75 wt. %, sulfur: 23.20 wt. %; whereas the experimental values were: carbon: 57.86 wt. %, hydrogen: 9.04 wt. %, sulfur: 21.79 wt. %. It was confirmed from the above results that the obtained liquid was compound 23d.

1.4 Synthesis of Compound 23e

Dehydrated toluene (1300 ml) was put into a 2000 ml eggplant-shaped flask, compound 23d (130 g, 450 mmol) was dissolved therein, and the resultant substance was heated to a temperature close to the boiling point thereof. Then, diphosphorus pentasulfide (171 g, 770 mmol) was slowly added thereto, and these substances were refluxed for 20 hours. The obtained solution was filtrated to remove diphosphorus pentasulfide. Extraction was caused with ether, the extracted substance was dried, and the solvent was removed. As a result, a yellow powder was obtained. The yield was 82%.

As a result of an H-NMR (CDCl$_3$) measurement, chemical shifts were observed in the vicinity of δ6.62, 2.59, 1.60-1.25, and 0.88 ppm. As a result of an IR (NaCl liquid film method) measurement, peaks were observed at 3040, 2924, 2852, and 1062 cm$^{-1}$. The results of the element analysis were as follows. The theoretical values were: carbon: 53.61 wt. %, hydrogen: 7.36 wt. %, sulfur: 39.03 wt. %; whereas the experimental values were: carbon: 54.42 wt. %, hydrogen: 6.76 wt. %, sulfur: 39.13 wt. %. It was confirmed from the above results that the obtained powder was compound 23e.

1.5 Synthesis of Compound 23f

Compound 23e (3.1 g, 12 mmol) was put into a 500 ml Schlenk tube under a nitrogen gas flow and dissolved in 140 ml of acetone. The resultant substance was kept at a temperature of 20° C. m-chlorobenzoic acid (48 g, 300 mmol) dissolved in acetone (210 ml) in advance was dropped thereto, and these substances were stirred for 30 minutes. After the acetone was removed, the resultant substance was dissolved in methylene chloride (220 ml). Sodium hexafluorophosphate (20 g, 120 mmol) was added thereto. After these substances were stirred at room temperature for 1 hour, acetonitrile (200 ml) was added thereto, and these substances were stirred for 15 minutes while the temperature was kept at 20° C. Triethylamine (56 ml) was added, and these substances were stirred for another hour. Then, extraction was caused with ether, the extracted substance was dried, and the solvent was removed. As a result, an orange powder was obtained. The yield was 23%.

As a result of an H-NMR (CDCl$_3$) measurement, chemical shifts were observed in the vicinity of δ6.34, 2.36, 1.44, 1.24, and 0.84 ppm. As a result of an IR (KBr method) measurement, peaks were observed at 3050, 2922, 2850, and 1500-1300 cm$^{-1}$. The results of the element analysis were as follows. The theoretical values were: carbon: 61.62 wt. %, hydrogen: 8.46 wt. %, sulfur: 29.91 wt. %; whereas the experimental values were: carbon: 61.90 wt. %, hydrogen: 8.52 wt. %, sulfur: 30.19 wt. %. It was confirmed from the above results that the obtained powder was compound 23f.

1.6 Synthesis of Compound 23g

Compound 23f (0.99 g, 2.3 mmol) was put into a 100 ml Schlenk tube under a nitrogen gas flow and dissolved in THF (25 ml). The resultant substance was cooled down to −78° C. Butyllithium (4.4 ml, 1.53 mol/L hexane solution) was dropped thereto by a syringe, and these substances were stirred for 10 minutes. Then, perfluorohexyl diiodine (PFHI; 1.5 ml) was dropped thereto, and these substances were stirred at −78° C. for 1 hour and at room temperature for 1 hour. Distilled water was added thereto to stop the reaction. Then, extraction was caused with ether, the extracted substance was dried, and the solvent was removed. The resultant substance was recrystallized with hexane. As a result, an orange powder was obtained. The yield was 40%.

As a result of an H-NMR (CDCl$_3$) measurement, chemical shifts were observed in the vicinity of δ2.42, 1.53, 1.27, and 0.89 ppm. As a result of an IR (KBr method) measurement, peaks were observed at 2952, 2922, 2852, and 1500-1300 cm$^{-1}$. The results of the element analysis were as follows. The theoretical values were: carbon: 38.83 wt. %, hydrogen: 8.46 wt. %, sulfur: 18.85 wt. %; whereas the experimental values were: carbon: 39.13 wt. %, hydrogen: 4.93 wt. %, sulfur: 19.44 wt. %. It was confirmed from the above results that the obtained powder was compound 23g.

1.7 Synthesis of Compound 23

Ni(cod)2 (0.28 g, 1.0 mmol) and 1,5-cod (0.11 g, 1.0 mmol) were put into a 50 ml Schlenk tube under a nitrogen gas flow and dissolved in 7 ml of DMF. 2,2'-bipyridine (0.19 g, 1.2 mmol) was added thereto. After it was confirmed that the solution turned purple, compound 23 g (0.46 g, 0.67 mmol) was added thereto. These substances were stirred at 50° C. for 24 hours, and then the reaction solution was directly put into methanol. The obtained powder was washed, filtrated, reprecipitated using methanol, and dried. As a result, a brown powder was obtained.

The number average molecular weight (Mn) was 3600. The results of the element analysis were as follows. The theoretical values were: carbon: 58.16 wt. %, hydrogen: 8.21 wt. %, sulfur: 28.24 wt. %; whereas the experimental values were:

carbon: 56.31 wt. %, hydrogen: 6.96 wt. %, sulfur: 26.99 wt. %. It was confirmed from the above results that the obtained powder was compound 23.

2. Synthesis of Compound 25

Hereinafter, synthesis of compound 25 will be described.

2.1 Synthesis of 1-bromo-2-dodecanol

In a 1000 ml eggplant-shaped flask, 16.9 g of 1-dodecane was dissolved in 800 ml of dimethyl sulfoxide (DMSO), and 25 ml of $H_2O$ and 100 g of N-bromosuccinimide (NBS) were added thereto. These substances were stirred at room temperature for 4 hours. Then, extraction was caused with ether, the extracted substance was dried, and the solvent was removed at reduced pressure. After the resultant substance was purified, a colorless transparent liquid was obtained. The yield was 59%.

2.2 Synthesis of 1-bromo-2-dodecanone

In a 1000 ml eggplant-shaped flask, 14 g of 1-bromo-2-dodecanol was dissolved in 110 ml of acetone. A solution obtained in advance by dissolving 35 g of sodium dichromate dihydrate in 150 ml of distilled water and 25 ml of sulfuric acid was dropped thereto. These substances were stirred at room temperature for 1.5 hours, and then 250 ml of ether was added thereto. The resultant substance was dehydrated, and the solvent was removed. As a result, a white solid was obtained. The yield was 80%.

2.3 Synthesis of O-ethyl-1-xanthyldodecane-2-one

In a 1000 ml eggplant-shaped flask, 9.2 g of 1-bromo-2-dodecanone was dissolved in 400 ml of acetone, and the resultant substance was heated to 50° C. Then, 5.6 g of potassium xanthogenate was added thereto, and these substances were refluxed for 4 hours. After the reflux, the reaction solution was injected into distilled water. Extraction was caused with ether, the extracted substance was dried, and the solvent was removed. As a result, a yellow crystal was obtained. The yield was 45%.

2.4 Synthesis of 4-decyl-1,3-dithiol-2-thione

In a 1000 ml eggplant-shaped flask, 44 g of O-ethyl-1-xanthyldodecane-2-one was dissolved in 600 ml of dehydrated toluene, and the resultant substance was heated to a temperature close to the boiling point thereof. Then, 120 g of diphosphorus pentasulfide was added thereto little by little, and these substances were refluxed for about 20 hours. The obtained solution was filtrated. Extraction was caused with ether, the extracted substance was dried, and the solvent was removed. As a result, a red oil-like target substance was obtained. The yield was 63%.

2.5 Synthesis of 2,6-didecyltetrathiafulvalene 3.3 g of 4-decyl-1,3-dithiol-2-thione was put into a 500 ml Schlenk tube under a nitrogen gas flow and dissolved in 40 ml of acetone. 48 g of m-chlorobenzoic acid dissolved in 210 ml of acetone in advance was dropped thereto, and then these substances were stirred for 30 minutes. After the acetone was removed, the resultant substance was dissolved in 220 ml of methylene chloride. When the substance became uniform, 20 g of sodium hexafluorophosphate was added thereto. These substances were stirred at room temperature for 1 hour, and 200 ml of acetonitrile was added thereto. These substances were stirred for 15 minutes. 56 ml of triethylamine was added thereto, and these substances were stirred for another hour. Then, extraction was caused with ether, the extracted substance was dried, and the solvent was removed. The resultant substance was purified and recrystallized. As a result, an orange powder was obtained. The yield was 22%.

As a result of an H-NMR ($CDCl_3$) measurement, chemical shifts were observed in the vicinity of 5.62 (s, 4H, Sr—H), 2.27 (t, 4H, J=7.6 Hz, $\alpha$-$CH_2$—), 1.53 (m, 4H, $\beta$-$CH_2$—), 1.29 (m, 28H, —$CH_2$—), and 0.88 (t, 6H, J=6.4 Hz, —$CH_3$) ppm. As a result of an IR (KBr method) measurement, peaks were observed at 3050, 2952, 2920, 2848, and 1500-1300 $cm^{-1}$. The results of the element analysis were as follows. The theoretical values were: carbon: 64.41 wt. %, hydrogen: 9.15 wt. %, sulfur: 26.45 wt. %; whereas the experimental values were: carbon: 64.64 wt. %, hydrogen: 9.18 wt. %, sulfur: 26.40 wt. %. It was confirmed from the above results that the obtained compound was 2,6-didecyltetrathiafulvalene.

2.6 Synthesis of 2,6-diiodine-3,7-didecyltetrathiafulvalene 2,6-diiodine-3,7-didecyltetrathiafulvalene was synthesized in accordance with formula (R8).

[Formula 55]

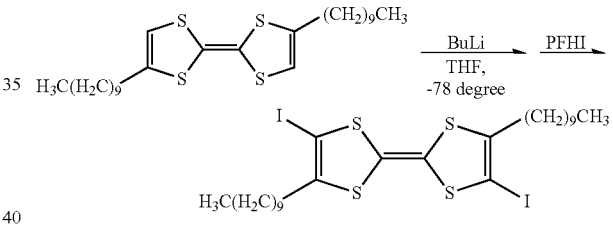

(R8)

1.1 g of 2,6-didecyl TTF was put into a 100 ml Schlenk tube under a nitrogen gas flow and dissolved in 25 ml of THF. The resultant substance was cooled down to −78° C. in a dry ice-methanol bath. Then, 4.4 ml of butyllithium (BuLi) was dropped thereto, and these substances were stirred for 10 minutes. Then, 1.5 ml of perfluorohexyl diiodine (PFHI) was dropped thereto, and these substances were stirred at −78° C. for 1 hour and at room temperature for 1 hour. Then, distilled water was added thereto to stop the reaction. Extraction was caused with ether, the extracted substance was dried, and the solvent was removed. The resultant substance was purified and recrystallized. As a result, an orange powder was obtained. The yield was 35%.

As a result of an H-NMR ($CDCl_3$) measurement, chemical shifts were observed in the vicinity of 2.37 (t, 4H, J=7.6 Hz, $\alpha$-$CH_2$—), 1.54 (m, 4H, $\beta$-$CH_2$—), 1.27 (m, 32H, —$CH_2$—), and 0.88 (t, 6H, J=6.4 Hz, —$CH_3$) ppm. As a result of an IR (KBr method) measurement, peaks were observed at 2954, 2916, 2848, and 1500-1300 $cm^{-1}$. The results of the element analysis were as follows. The theoretical values were: carbon: 42.39 wt. %, hydrogen: 5.75 wt. %, sulfur: 17.41 wt. %, iodine: 34.45 wt. %; whereas the experimental values were: carbon: 42.18 wt. %, hydrogen: 5.33 wt. %, sulfur: 17.75 wt. %, iodine: 36.00 wt. %. It was confirmed from the above results that the obtained compound was 2,6-diiodine-3,7-didecyltetrathiafulvalene.

2.7 Synthesis of 2,6-diiodine-3,7-diphenyltetrathiafulvalene 2,6-diiodine-3,7-diphenyltetrathiafulvalene was synthesized in accordance with formula (R9).

[Formula 56]

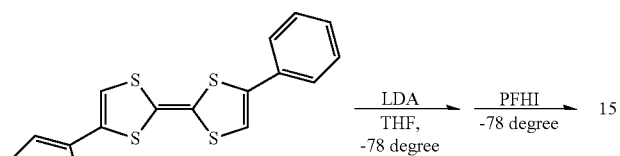

(R9)

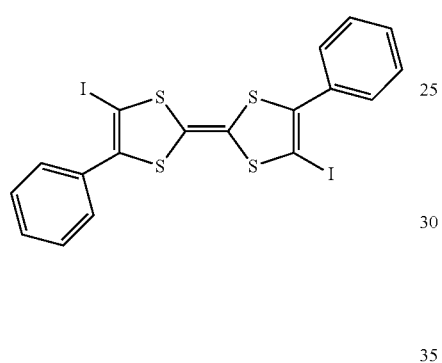

2.8 ml of diisopropylamine and 15 ml of THF were put into a 50 ml Schlenk tube under a nitrogen atmosphere, and these substances were kept at −78° C. 13.7 ml of BuLi was added thereto, and these substances were stirred for about 1 hour to synthesize lithium diisopropylamide (LDA). Next, 3.0 g of 2,6-diphenyltetrathiafulvalene (produced by Aldrich) was put into the Schlenk tube under a nitrogen gas flow and dissolved in 50 ml of THF. The resultant substance was kept at −78° C. Then, 9.33 g of perfluorohexyl diiodine was dropped thereto, and these substances were stirred for 1 hour and at room temperature for another hour. After the reaction, distilled water was added thereto to stop the reaction. Then, the resultant substance was filtrated, washed and recrystallized. As a result, a red needle-like crystal was obtained. The yield was 52%.

As a result of an H-NMR (CDCl$_3$) measurement, chemical shifts were observed in the vicinity of 7.4-7.5 (phenyl group, 10H) ppm. As a result of an IR (KBr method) measurement, peaks were observed at 3052, 734, and 691 cm$^{-1}$. The results of the element analysis were as follows. The theoretical values were: carbon: 35.53 wt. %, hydrogen: 1.64 wt. %, sulfur: 21.05 wt. %, iodine: 41.78 wt. %; whereas the experimental values were: carbon: 35.43 wt. %, hydrogen: 1.68 wt. %, sulfur: 22.79 wt. %, iodine: 37.67 wt. %. It was confirmed from the above results that the obtained compound was 2,6-diiodine-3,7-diphenyltetrathiafulvalene.

2.8 Synthesis of compound 25 (poly-(3,7-diphenyltetrathiafulvalene-3,7-didecyltetrathiafulvalene))

Compound 25 was synthesized in accordance with formula (R10).

[Formula 57]

(R10)

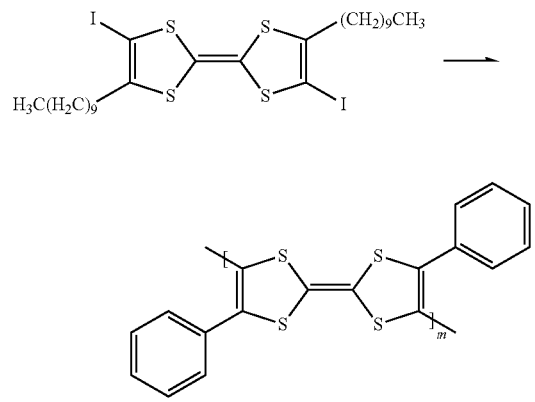

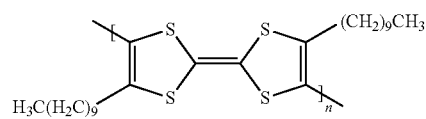

0.35 g of Ni(Cod)$_2$ and 0.14 g of 1,5-cod were put into a 50 ml Schlenk tube under a nitrogen atmosphere and dissolved in 10 ml of DMF. 0.16 g of 2,2'-bipyridine was added thereto. After it was confirmed that the solution turned purple, 0.21 g of 2,6-diiodine-3,7-diphenyltetrathiafulvalene and 0.26 g of 2,6-diiodine-3,7-didecyltetrathiafulvalene were added thereto. These substances were stirred at 50° C. for 24 hours, and then the reaction solution was reprecipitated with methanol. The resultant substance was filtrated and washed with ammonia water. Then, the resultant substance was washed with an EDTA.2K aqueous solution and hot water, reprecipitated, and dried. As a result, a brown powder was obtained. The yield was 88%.

As a result of an H-NMR (CDCl$_3$) measurement, chemical shifts were observed in the vicinity of 0.88, 1.25, 2.4 (alkyl group), 6.5, and 7.5 (phenyl group) ppm. As a result of an IR (KBr method) measurement, peaks were observed at 2800-2700, 1600-1450, and 1200-1300 cm$^{-1}$. It was confirmed from the above results that the obtained compound was compound 25.

3. Synthesis of Compound 27

Compound 27 was synthesized in accordance with formula (R11) shown below.

[Formula 58]

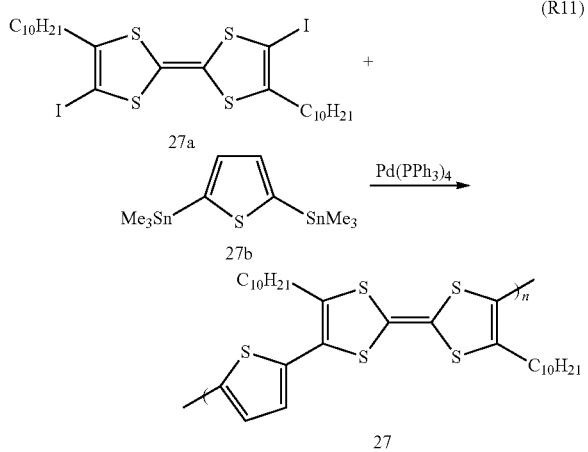

(R11)

3.1 Synthesis of Compound 27a

Compound 27a was synthesized by substantially the same method as compound 23 g except that dodecane-1-ene was used as a starting substance. An orange powder was obtained as compound 27a.

As a result of an H-NMR (CDCl$_3$) measurement, chemical shifts were observed in the vicinity of 2.37, 1.54, 1.27, and 0.88 ppm. As a result of an IR (KBr method) measurement, peaks were observed at 2954, 2916, 2848, and 1500-1300 cm$^{-1}$. The results of the element analysis were as follows. The theoretical values were: carbon: 42.39 wt. %, hydrogen: 5.75 wt. %, sulfur: 17.41 wt. %; whereas the experimental values were: carbon: 42.18 wt. %, hydrogen: 5.33 wt. %, sulfur: 17.75 wt. %. It was confirmed from the above results that the obtained compound was compound 27a.

3.2 Synthesis of Compound 27

Commercially available compound 27b (2,5-bistrimethylstannylthiophene; 0.15 g, 0.36 mmol) was put into a 50 ml Schlenk tube under a nitrogen atmosphere, and DMF (25 ml) was added thereto. Pd(PPh$_3$)$_4$ (40 mg, 0.035 mmol) and compound 27a (0.26 g, 0.36 mmol) were added thereto, and these substances were stirred at 70° C. for 48 hours. After the reaction, the reaction solution with no further treatment was put into an aqueous solution of potassium fluoride (400 ml), and these substances were stirred for 1 hour. This operation cycle was repeated 3 times. 1NHCl (400 ml) was further added to wash the resultant substance 3 times in repetition. The obtained powder was filtrated, reprecipitated with methanol, and dried. As a result, a red powder was obtained as compound 27. The yield was 91%.

As a result of an H-NMR (CDCl$_3$) measurement, chemical shifts were observed in the vicinity of 7.01, 2.85, 1.65, and 0.88 ppm. The number average molecular weight (Mn) was 6800. The results of the element analysis were as follows. The theoretical values were: carbon: 60.21 wt. %, hydrogen: 7.41 wt. %, sulfur: 26.80 wt. %; whereas the experimental values were: carbon: 59.17 wt. %, hydrogen: 7.04 wt. %, sulfur: 26.06 wt. %. It was confirmed from the above results that the obtained compound was compound 27.

4. Synthesis of Compound 28

Compound 28 was synthesized in accordance with formula (R12) shown below.

[Formula 59]

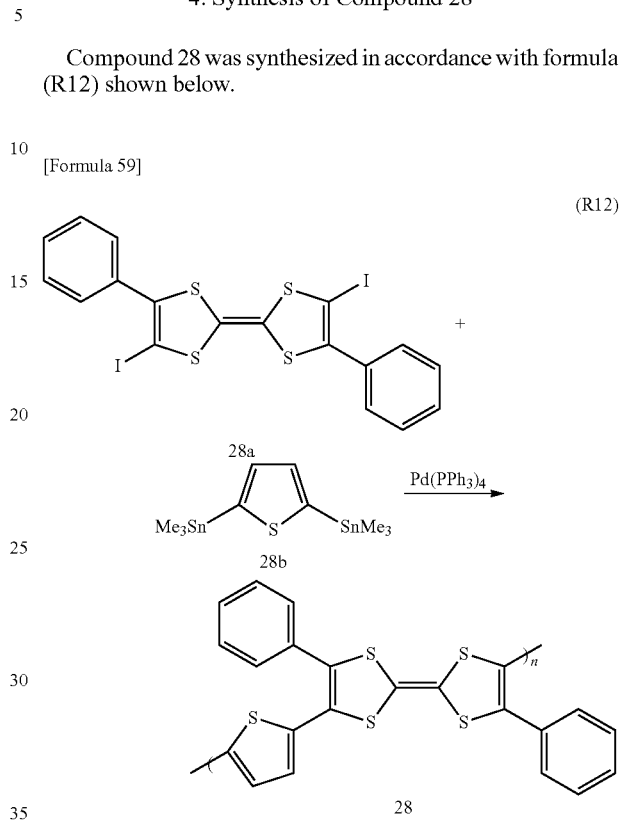

(R12)

4.1 Synthesis of Compound 28a

Compound 28a was synthesized in accordance with reaction formula (R9) by the method described above in section 2.7.

4.2 Synthesis of Compound 28

0.366 g of commercially available 2,5-bis(trimethylstannyl)thiophene was put into a 50 ml Schlenk tube under a nitrogen atmosphere, and 40 ml of DMF was added thereto. 96 mg of Pd(PPh$_3$)$_4$ and 0.5 g of compound 28a were added thereto, and these substances were stirred at 90° C. for hours. After the reaction, the reaction solution was dropped into 500 ml of aqueous solution of potassium fluoride, and these substances were stirred for 2 hours and then filtrated. The resultant substance was washed with 500 ml of 1NHCl, washed with methanol, and dried. As a result, a brown powder was obtained as compound 28. The yield was 51%.

As a result of an H-NMR (CDCl$_3$) measurement, chemical shifts were observed in the vicinity of 6.61 and 1.25-0.88 ppm. The number average molecular weight (Mn) was 4400. The results of the element analysis were as follows. The theoretical values were: carbon: 60.51 wt. %, hydrogen: 2.77 wt. %, sulfur: 36.72 wt. %; whereas the experimental values were: carbon: 61.51 wt. %, hydrogen: 2.76 wt. %, sulfur: 35.73 wt. %. It was confirmed from the above results that the obtained compound was compound 28.

5. Synthesis of Compound 29

Compound 29 was synthesized in accordance with formula (R13) shown below.

[Formula 60]

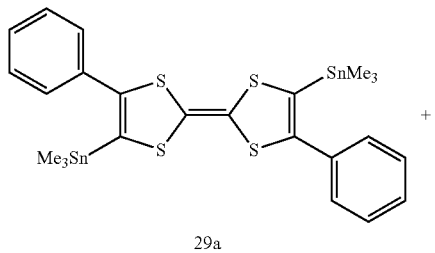

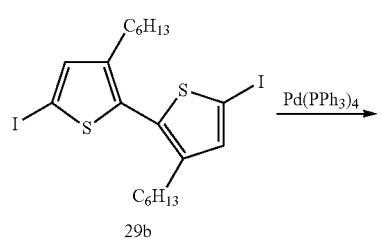

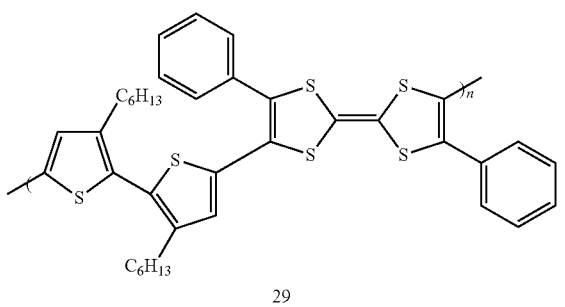

Compound 29a was obtained as follows. Commercially available diphenyltetrathiafulvalene was dissolved in THF, lithium diisopropylamide (LDA) was added thereto, and then trimethylstannyl chloride was dropped thereto. Compound 29 was synthesized by substantially the same method as compound using compound 29a and compound 29b. The resultant substance was a brown powder, and the yield was 46%.

The number average molecular weight (Mn) of the obtained compound was 3600. The results of the element analysis were as follows. The theoretical values were: carbon: 66.42 wt. %, hydrogen: 5.57 wt. %, sulfur: 28.00 wt. %; whereas the experimental values were: carbon: 64.31 wt. %, hydrogen: 5.85 wt. %, sulfur: 26.11 wt. %. It was confirmed from the above results that the obtained compound was compound 29.

6. Synthesis of Compound 30

Compound 30 was synthesized in accordance with formula (R14) shown below.

[Formula 61]

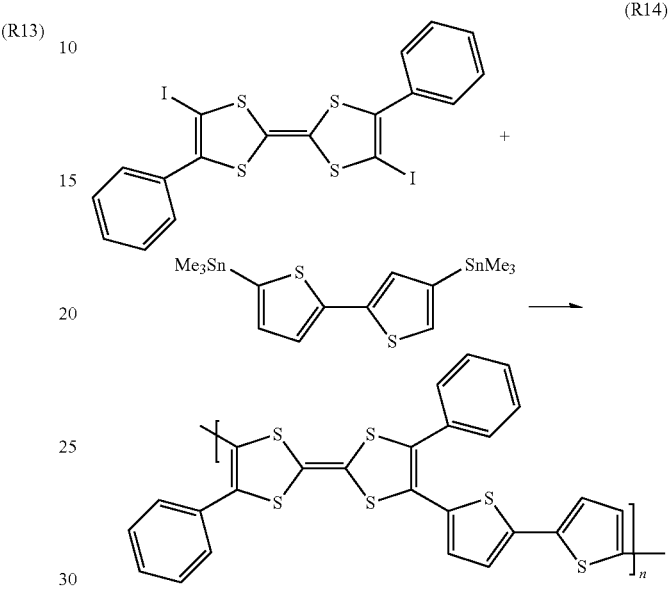

Compound 30 was synthesized in the same method as compound 28 except that 2,5-bis(trimethylstannyl) dithiophene was used instead of 2,5-bis(trimethylstannyl) thiophene. The resultant substance was a brown powder, and the yield was 68%.

The number average molecular weight (Mn) of the obtained compound was 6600. The results of the element analysis were as follows. The theoretical values were: carbon: 56.70 wt. %, hydrogen: 2.56 wt. %, sulfur: 34.94 wt. %; whereas the experimental values were: carbon: 56.21 wt. %, hydrogen: 2.62 wt. %, sulfur: 33.78 wt. %. It was confirmed from the above results that the obtained compound was compound 30.

7. Synthesis of Compound 34

Compound 34 was synthesized in accordance with formula (R15) shown below.

[Formula 62]

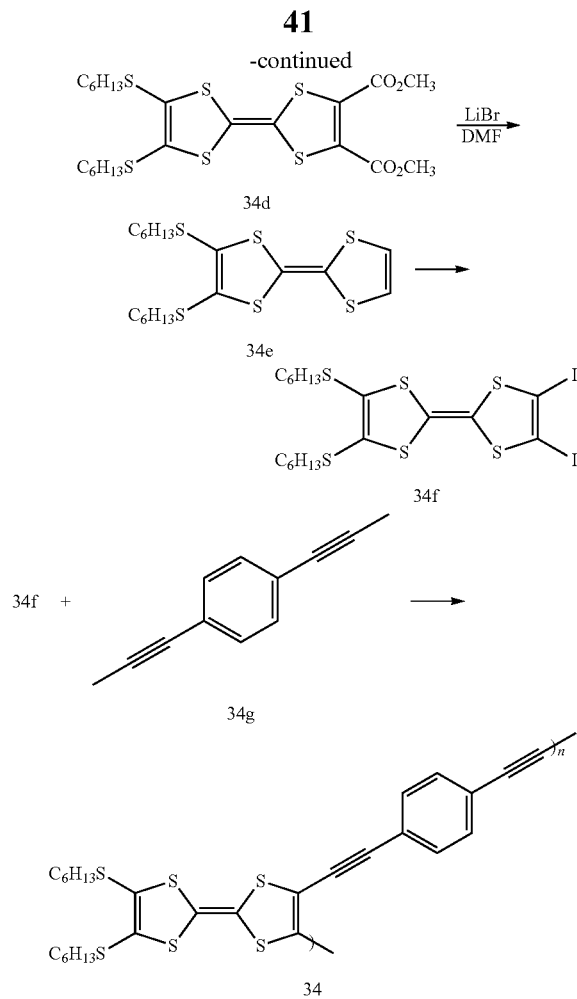

Specifically, compound 34 was synthesized by dehydrohalogenation polycondensation of compound 34f having iodine as a substituent at positions 4 and 5 and 1,4-diethynylbenzene having an acetylene site.

7.1 Synthesis of compound 34a (4,5-bis(methoxycarbonyl)-1,3-dithiol-2-thione)

Ethylene trithiocarbonate (20 g, 146 mmol) and dimethyl acetylenedicarboxylate (21.6 ml, 176 mmol) were put into a 1000 ml eggplant-shaped flask as a reaction vessel and dissolved in toluene (75 ml). The resultant substance was refluxed for 6 hours. After the reflux, hexane (200 ml) was added thereto, and a precipitate was generated and ice-cooled. The deposited crystal was filtrated and dried. As a result, a yellow crystal was obtained. The yield was 29 g.

The structure of the obtained compound was identified by an H-NMR (CDCl$_3$) measurement and an IR measurement (NaCl liquid film method). As a result of the H-NMR measurement, a chemical shift was observed at 3.90 ppm. As a result of the IR measurement, peaks were observed at 1741-1718 (C=O vibration) and 1058 (C=S stretching vibration) cm$^{-1}$. It was confirmed from these results that the obtained compound was compound 34a.

7.2 Synthesis of compound 34b (4,5-bis(methoxycarbonyl)-1,3-dithiol-2-one)

Mercury acetate (7.9 g, 25 mmol) was put into a 500 ml eggplant-shaped flask, and glacial acetic acid (65 ml) was added thereto. Then, compound 34a (2.5 g, 10 mmol) dissolved in chloroform (55 ml) was dropped thereto, and these substances were stirred at room temperature for 2 hours. The resultant solution was filtrated and neutralized with sodium hydrogen carbonate. Extraction was caused with chloroform, the extracted substance was dried, and the solvent was removed. As a result, 1.9 g of pale yellow crystal was obtained. The yield was 83%.

The structure of the obtained compound was identified by an H-NMR (CDCl$_3$) measurement and an IR measurement (NaCl liquid film method). As a result of the H-NMR measurement, chemical shifts were observed in the vicinity of 3.85, 2.81, 1.70-1.22, and 0.89 ppm. As a result of the IR measurement, peaks were observed at 2952-2926 (C—H stretching vibration) and 1730 (C=O vibration) cm$^{-1}$. It was confirmed from these results that the obtained compound was compound 34b.

7.3 Synthesis of compound 34c (4,5-bis(hexylthio)-1,3-dithiol-2-thione)

21.6 ml of carbon disulfide (120 mmol) was put into a 200 ml Schlenk tube, sodium metal (2.76 g) was added thereto, and these substances were stirred for 1 hour. Then, DMF (24 ml) was added thereto, and these substances were refluxed overnight. After the reflux, the resultant substance was kept at 10° C., hexyl bromide (16.9 ml) was added thereto, and these substances were stirred at room temperature for about 1 hour. A small amount of water was added to the obtained solution. Extraction was caused with chloroform, the extracted substance was dried, and the solvent was removed. As a result, an orange oil-like compound was obtained. The yield was 21.9 g.

The structure of the obtained compound was identified by an H-NMR (CDCl$_3$) measurement and an IR measurement (NaCl liquid film method). As a result of the H-NMR measurement, chemical shifts were observed at 2.87, 1.78-1.20, and 0.90 ppm. As a result of the IR measurement, peaks were observed at 2945-2854 (C—H stretching vibration) and 1067 (C=S stretching vibration) cm$^{-1}$. It was confirmed from these results that the obtained compound was compound 34c.

7.4 Synthesis of compound 34d (4,5-bis(hexylthio)-4',5'-bis(methoxycarbonyl)tetrathiafulvalene)

Compound 34c (2.93 g, 8.0 mmol) and compound 34b (1.87 g, 8.0 mmol) were put into a 300 ml eggplant-shaped flask and dissolved in toluene (100 ml). Triethyl phosphite (13 ml, 80 mmol) was added thereto, and these substances were refluxed for 16 hours. After the reflux, the resultant substance was purified. As a result, 1.53 g of dark red oil-like substance was obtained. The yield was 35%.

The structure of the obtained compound was identified by an H-NMR (CDCl$_3$) measurement and an IR measurement (NaCl liquid film method). As a result of the H-NMR measurement, chemical shifts were observed in the vicinity of 3.85, 2.81, 1.70-1.22, and 0.89 ppm. As a result of the IR measurement, peaks were observed at 2952-2926 (C—H stretching vibration) and 1730 (C=O vibration) cm$^{-1}$. It was confirmed from these results that the obtained compound was compound 34d.

7.5 Synthesis of compound 34e (4,5-bis(hexylthio)tetrathiafulvalene)

Compound 34d (0.6 g, 1.08 mmol) was put into a 200 ml Schlenk tube and dissolved in DMF (140 ml). Lithium bromide (8.4 g, 97.2 mmol) was added thereto, and these substances were stirred at 140° C. for 3 hours. After the stirring, the resultant substance was cooled down to room temperature. Brin (100 ml) was added thereto. Extraction was caused with methylene chloride, the extracted substance was dried, and the solvent was removed. As a result, 0.36 g of brown oil-like substance was obtained. The yield was 77%.

The structure of the obtained compound was identified by an H-NMR (CDCl$_3$) measurement and an IR measurement. As a result of the H-NMR measurement, chemical shifts were observed in the vicinity of 6.32, 2.81, 1.70-1.22, and 0.89 ppm. As a result of the IR measurement, peaks were observed at 3066 (C=C—H vibration) and 2952-2926 (C—H stretching vibration) cm$^{-1}$. It was confirmed from these results that the obtained compound was compound 34e.

7.6 Synthesis of compound 34f (4,5-bis(hexylthio)-4,5'-diiodinetetrathiafulvalene)

Diisopropylamide (0.35 ml) was put into a 25 ml Schlenk tube at −78° C. under an argon atmosphere, and THF (3 ml) was added thereto. 1.6 M butyllithium hexane solution (1.56 ml, 2.5 mmol) was added thereto, and these substances were stirred for 1 hour. As a result, a lithium diisopropylamide (hereinafter, referred to as "LDA") solution was obtained.

Next, compound 34e (0.36 g, 0.82 mmol) was put into a 50 ml Schlenk tube at −78° C. under a nitrogen atmosphere, and THF (10 ml) was added thereto. LDA was dropped to this solution, and these substances were stirred for 30 minutes. Then, perfluorohexyldiiodine (hereinafter, referred to as "PFHI") (0.46 ml, 2.13 mmol) was added thereto, and these substances were stirred for 1 hour and stirred at room temperature for another hour. A small amount of water was added thereto to stop the reaction. Extraction was caused with ether, the extracted substance was dried, and the solvent was removed. The resultant substance was recrystallized with hexane. As a result, a yellow powder was obtained. The yield was 0.13 g and 23%.

The structure of the obtained compound was identified by an H-NMR (CDCl$_3$) measurement, an IR measurement (KBr method) and an element analysis. As a result of the H-NMR measurement, chemical shifts were observed in the vicinity of 2.80, 1.70-1.22, and 0.89 ppm. With the obtained compound, two peaks in the vicinity of 6.3 ppm derived from proton of the TTF ring, which were observed with compound 34e, were not observed. From this, it is understood that TTF was iodided. As a result of the IR measurement, peaks were observed at 2950-2852 (C—H stretching vibration) cm$^{-1}$. The C—H stretching vibration of the TTF ring in the vicinity of 3060 cm$^{-1}$, which was observed with compound 34e, was extinct. From this also, it is understood that that proton of the TTF ring was iodided. The results of the element analysis were as follows. The theoretical values were: carbon: 31.40 wt. %, hydrogen: 3.81 wt. %, sulfur: 27.94 wt. %, iodine: 36.85 wt. %; whereas the experimental values were: carbon: 31.67 wt. %, hydrogen: 3.78 wt. %, sulfur: 27.97 wt. %, iodine: 37.16 wt. %. It was confirmed from these results that the obtained compound was compound 34f.

7.7 Synthesis of compound 34 (poly-1,2-(p-acetylphenyl-tetrathiafulvalene))

Compound 34f (138 mg, 0.2 mmol) was put into a 50 ml Schlenk tube under a nitrogen atmosphere and dissolved in 20 ml of THF. Copper iodide (2 mg, 0.01 mmol) and tetrakis(triphenylsulfone)palladium (hereinafter, referred to as "Pd(PPh$_3$)$_4$") (12 mg, 0.01 mmol) were added thereto. Triethylamine (15 ml) was also added thereto, and these substances were stirred. 1,4-diethynylbenzene (25 mg, 0.2 mmol) as compound 34 g was added thereto, and these substances were stirred at 60° C. for 48 hours. After the reaction, the reaction solution was transferred to methanol (500 ml), and these substances were further stirred. The resultant substance was washed, dissolved in THF, reprecipitated with methanol, and dried. As a result, a black powder was obtained. The yield was 91%.

The structure of the obtained compound was identified by a molecular weight measurement, an H-NMR (CDCl$_3$) measurement, an IR measurement and an element analysis. The results will be shown below sequentially.

The molecular weight measurement of the obtained compound was performed by GPC using THF. The obtained weight average molecular weight was 5500 (Mw/Mn=1.49) as converted into polystyrene. The results of the element analysis were as follows. The theoretical values were: carbon: 60.17 wt. %, hydrogen: 5.41 wt. %, sulfur: 34.42; whereas the experimental values were: carbon: 61.45 wt. %, hydrogen: 5.09 wt. %, sulfur: 33.46 wt. %. The experimental values and the theoretical values match each other to a certain degree.

As a result of the H-NMR (CDCl$_3$) measurement, all the peaks were broader than those of a monomer, which implies that the molecule was a polymerization product. Chemical shifts were observed at 0.95 (—CH$_3$), 1.15-1.80 (—(CH$_2$)$_4$—), 2.85 (SCH$_3$), and 7.10-7.60 (aromatic).

As a result of the IR measurement, peaks were observed in the vicinity of 2990-2800, 2172, 2150, 1480, 1285, and 650-800 cm$^{-1}$. Neither the peak in the vicinity of 3282 cm$^{-1}$ derived from the triple bond stretching vibration nor the peak in the vicinity of 2090 cm$^{-1}$ derived from the 1-substituted acetylene stretching vibration, which were observed with the diethynyl monomer, were observed. Peaks derived from 2-substituted acetylene stretching vibration were observed in the vicinity of 2172 and 2150 cm$^{-1}$. From this, it is understood that polymerization progressed. In the vicinity of 650-800 cm$^{-1}$, C—S stretching vibration derived from the TTF structure and spectrum derived from ring out-plane bending vibration were observed. From these, it was confirmed that the obtained compound was a polymerization product having a TTF structure. From these results, it was found that the obtained powder was compound 34.

Example 2

Hereinafter, production of electricity storage devices according to the present invention and results of characteristic evaluation will be described.

1. Production of Electricity Storage Devices

1.1 Production of Electricity Storage Device A Using Compound 29

A positive electrode was produced as follows. As a positive electrode active substance, poly-1,4-(p-thiol-TTF), which is a polymerization product represented by chemical formula (29), was used. The average molecular weight of poly-1,4-(p-thiol-TTF) used here was about 10000, and the maximum theoretical capacity thereof was 78 mAh/g. Poly-1,4-(p-thiol-TTF) was pulverized with a mortar before being mixed. After being pulverized with the mortar, the polymerization product had a particle diameter of about 10 μm. 37.5 m of poly-1,4-(p-thiol-TTF) as the active substance and 100 mg of acetylene black as a conductor were mixed uniformly, 25 mg of polytetrafluoroethylene as a binder was added thereto, and these substances were mixed. Thus, a positive electrode active substance compound was obtained. The positive electrode compound was pressure-contacted on an aluminum wire net and vacuum-dried. The resultant material was punched into a disc having a diameter of 13.5 mm to produce positive electrode A. The weight of the positive electrode active substance applied was 1.7 mg/cm$^2$ per unit area size of the electrode.

As a negative active substance, lithium metal was used. Lithium metal (thickness: 300 μm) was punched into a disc having a diameter of 15 mm and pasted on a disc-shaped current collector plate also having a diameter of 15 mm to produce a negative electrode.

An electrolytic solution was produced as follows. A solvent was produced by mixing ethylene carbonate (EC) and propylene carbonate (PC) at a volume ratio of 1:1. The electrolytic solution was produced by dissolving lithium hexafluorophosphate having a concentration of 1 mol/L as a salt in the solvent. The relative dielectric constant of the solvent used here was 78. The electrolytic solution was used in the state of impregnating the positive electrode, the negative electrode and a porous polyethylene sheet (thickness: 20 μm).

As described with reference to FIG. 1, the positive electrode, the negative electrode and the electrolytic solution were accommodated in a case of a coin-type battery and held by the sealing plate provided with a gasket. The resultant assembly was caulked by a press. Thus, coin-type electricity storage device A was obtained.

1.2 Production of Electricity Storage Device B Using Compound 34

As a positive electrode active substance, compound 34 synthesized as described above was used. An electricity storage device was produced by substantially the same method as electricity storage device A except for the material of the positive electrode active substance. Thus, electrode B and coin-type electricity storage device B were obtained.

1.3 Production of Electricity Storage Device C Using Compound 23

As a positive electrode active substance, compound 23 synthesized as described above was used. An electricity storage device was produced by substantially the same method as electricity storage device A except for the material of the positive electrode active substance. Thus, electrode C and coin-type electricity storage device C were obtained.

1.4 Production of Electricity Storage Device D Using Compound 25

As a positive electrode active substance, compound 25 synthesized as described above was used. An electricity storage device was produced by substantially the same method as electricity storage device A except for the material of the positive electrode active substance. Thus, electrode D and coin-type electricity storage device D were obtained.

1.5 Production of Electricity Storage Device E Using Compound 27

As a positive electrode active substance, compound 27 synthesized as described above was used. An electricity storage device was produced by substantially the same method as electricity storage device A except for the material of the positive electrode active substance. Thus, electrode E and coin-type electricity storage device E were obtained.

1.6 Production of Electricity Storage Device F Using Compound 28

As a positive electrode active substance, compound 28 synthesized as described above was used. An electricity storage device was produced by substantially the same method as electricity storage device A except for the material of the positive electrode active substance. Thus, electrode F and coin-type electricity storage device F were obtained.

1.7 Production of Electricity Storage Device G Using Compound 30

As a positive electrode active substance, compound 30 synthesized as described above was used. An electricity storage device was produced by substantially the same method as electricity storage device A except for the material of the positive electrode active substance. Thus, electrode G and coin-type electricity storage device G were obtained.

1.8 Production of an Electricity Storage Device as a Comparative Example

As a comparative example, an electricity storage device using a polymerization product represented by the following chemical formula (36) (poly-TTF compound) as a positive electrode active substance was produced. Poly-TTF was synthesized by reacting poly(vinyl alcohol) and a tetrathiafulvalene carboxyl derivative by dehydration condensation. The weight average molecular weight of the poly-TTF used here was about 50000. The electricity storage device of the comparative example was produced by substantially the same method as electricity storage device A except for the polymerization product used.

[Formula 63]

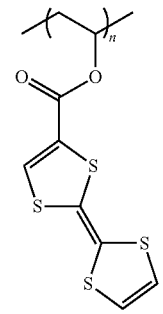

2. Evaluation of Electrodes

Electrodes A through G produced above were subjected to an evaluation of electrochemical stability against an oxidation/reduction reaction. The evaluation of stability was performed by using each of electrodes A through G or the comparative example electrode as a working electrode, lithium metal as a counter electrode and lithium metal as a reference electrode. These electrodes were located in a beaker cell immersed with an electrolytic solution. The electrolytic solution was obtained by dissolving lithium hexafluorophosphate, having a concentration of 1 mol/L as a support electrolyte salt, in propylene carbonate (PC) as a solvent.

The stability evaluation was performed as follows. Each working electrode was scanned over a range of potentials of 3.0 V (lower limit) to 4.0 V (upper limit) with respect to the lithium reference electrode. Specifically, the scanning was first performed in a noble direction from the immersion potential at a scanning rate of 0.05 mV/sec and the scanning was repeated between the upper limit and the lower limit. The scanning was performed 10 times. In order to eliminate the influence of gas adsorbed to the surface of the electrode and of dissolved oxygen in the electrolytic solution, the stability was evaluated by comparing the scanning result obtained by the third scanning and the scanning result obtained by the tenth scanning.

As a result of the measurement, electrodes A through G and the comparative example electrode exhibited two-stage oxidation/reduction current peaks derived from the tetrathiafulvalene structure. It was confirmed that these electrodes had oxidation/reduction activity. Regarding the stability, with electrodes A through G, the oxidation/reduction peak current value at each stage of the tenth cycle matched the peak current value of the third cycle. By contrast, with the comparative example electrode, the peak current values of the tenth cycle were lower by 20% than those of the third cycle. From this, it is considered that the electrodes of the examples have a high stability at the time of oxidation/reduction, whereas the oxidation/reduction activity of the comparative example electrode is lower by 20% than that of the electrodes of the examples.

3. Evaluation of Electricity Storage Devices

Electricity storage devices A through G and comparative example electricity storage device were subjected to an evaluation of charge/discharge capacity. The charge/discharge range was set to a range of potentials at which each material can be oxidized/reduced. Specifically, for electricity storage device A, the upper limit of voltage for charge was set to 4.1 V, and the lower limit of voltage for discharge was set to 3.1 V. For electricity storage device B, the upper limit of voltage for charge was set to 4.0 V, and the lower limit of voltage for discharge was set to 3.2 V. For electricity storage devices C through G, the upper limit of voltage for charge was set to 4.0 V, and the lower limit of voltage for discharge was set to 3.0 V. The charge/discharge operation was performed at a constant current of 0.1 mA. The pause time after the charge and before the discharge was zero.

FIG. 3 through FIG. 9 are graphs respectively showing the battery capacity vs. battery voltage relationship of electricity storage devices A through G at the third cycle of the charge/discharge operation for evaluation. As shown in FIG. 3 through FIG. 9, it was confirmed that electricity storage devices A through G can be reversibly charged/discharged in a range of about 3 to 4 V. It was confirmed from the above results that the polymerization products according to the present invention each act as an active substance for an electricity storage device.

The capacity of the electricity storage device was evaluated based on the value obtained by dividing the discharge capacity at the third cycle of the charge/discharge operation by the weight of the active substance, namely, based on the discharge capacity per weight of the active substance. The ratio of the discharge capacity of the active substance with respect to the theoretical capacity is shown with the percentage. The evaluation of the charge/discharge capacity was performed until the 50th cycle. The cycle characteristic was evaluated based on the ratio of the discharge capacity maintained at the 10th cycle and the 50th cycle, with the discharge capacity at the third cycle being set as 100%. The results are shown in Table 1.

TABLE 1

| | Measured capacity | | | Ratio of capacity maintained after repetition [%] | |
|---|---|---|---|---|---|
| | Theoretical capacity [mAh/g] | Discharge capacity [mAh/g] | Utilization factor [%] | 10th cycle | 50th cycle |
| Electricity storage device A (Compound 29) | 78 | 72 | 93 | 100 | 98 |
| Electricity storage device B (Compound 34) | 96 | 90 | 94 | 100 | 98 |
| Electricity storage device C (Compound 23) | 126 | 75 | 60 | 100 | 98 |
| Electricity storage device D (Compound 25) | 128 | 90 | 70 | 100 | 99 |
| Electricity storage device E (Compound 27) | 95 | 90 | 95 | 99 | 97 |
| Electricity storage device F (Compound 28) | 128 | 121 | 95 | 100 | 98 |
| Electricity storage device G (Compound 30) | 103 | 98 | 95 | 100 | 98 |
| Comparative example | 180 | 150 | 80 | 80 | 40 |

As shown in Table 1, even when the charge/discharge operation is repeated until the 50th cycle, electricity storage devices A through G according to the present invention all had a high capacity maintaining rate of 97% or higher, did not decrease the capacity and exhibited a good cycle characteristic. From these results, it is understood that the electricity storage materials according to the present invention are compounds which are reversibly charge/discharge-reactable. It was also found that the electricity storage materials according to the present invention are reversibly charge/discharge-reactable within a range of potentials of about 3.0 to 4.0 V (with respect to lithium as the reference).

By contrast, the comparative example electricity storage device initially exhibited a good charge/discharge characteristic, but the charge/discharge capacity thereof was decreased to 80% of the initial capacity at the 10th cycle and to 40% of the initial capacity at the 50th cycle. As a result of examination of the present inventors, this is considered to occur for the following reason. At an initial stage of the charge/discharge cycles, an oxidation/reduction reaction of two electrons from the tetrathiafulvalene structure properly occurs. However, as the charge/discharge operation is repeated, some structural change or environmental change around the tetrathiafulvalene structure is caused. As a result, at the 50th cycle, an oxidation/reduction reaction of only one electron occurs, and so the capacity is substantially decreased.

From the above results, it has been confirmed that a good cycle characteristic is not necessarily obtained from every polymerization product of tetrachalcogenofulvalene but that molecule design is very important. Namely, it has been clarified that an electricity storage material having a good cycle characteristic is provided by designing a polymerization product having a tetrachalcogenofulvalene structure in a repeat unit of the main chain as according to the present invention.

There are examples in which the discharge capacity of the electricity storage device is lower than the theoretical capacity, namely, the utilization factor is low. One presumable reason for this is wettability of the electrode active substance and the electrolytic solution. The reason is as follows. In order to cause a charge/discharge reaction of the electrode active substance, it is necessary to put the electrode active substance into contact with the electrolytic solution. Where the wettability of the electrode active substance and the electrolytic solution is low, the entirety of the active substance may not contribute to the reaction. This is presumed to be avoided by designing the device in a certain manner; for example, by optimizing the composition of the electrolytic solution.

As shown in Table 1, electricity storage devices C and D include polymerization products in which tetrachalcogenofulvalene structures are directly bonded to each other. Although the theoretical capacity is as large as 126 to 128 mAh/g, the utilization factor is limited to 60 to 70%. Among the electricity storage devices according to the present invention, electricity storage devices C and D have a relatively low utilization factor. It is considered that in order to improve the utilization factor of a polymerization product in which tetrachalcogenofulvalene structures are directly bonded to each other, the design of the device needs to be optimized.

By contrast, as shown in Table 1, electricity storage devices A and E through G include polymerization products in which tetrachalcogenofulvalene structures are bonded to each other with a thiophene structure sandwiched therebetween. The utilization factor is 93% or higher. From this, it is considered that a polymerization product in which tetrachalcogenofulvalene structures are bonded to each other with a thiophene structure sandwiched therebetween has a high utilization factor regardless of the type of substituent other than the tetrachalcogenofulvalene structures and so is a preferable electrode active substance providing a large capacity. These electricity storage devices also have a large theoretical capacity of 78 to 128 mAh/g.

Electricity storage device B includes a polymerization product in which tetrachalcogenofulvalene structures are bonded to each other with a (—C≡C-ph-C≡C—) structure sandwiched therebetween. The utilization factor is as high as 96%. Namely, a polymerization product in which tetrachalcogenofulvalene structures are bonded to each other with a (—C≡C-ph-C≡C—) structure sandwiched therebetween has a high utilization factor regardless of the type of substituent other than the tetrachalcogenofulvalene structures and so is a preferable electrode active substance providing a large capacity. This electricity storage device also has a large theoretical capacity of 96 mAh/g.

As shown in Table 1, the theoretical capacity of the electricity storage devices used in these examples is 78 to 128 mAh/g, but the theoretical capacity of an electricity storage device according to the present invention is not limited to a value in this range. By performing molecule design of an electricity storage material within a range represented by general formulas (1) through (17), an electricity storage device having a theoretical capacity larger than this range can be realized.

For example, where the octyl group of electricity storage device C is replaced with a methyl group, the molecule can be easily made more lightweight, and so the capacity can be improved. Where the octyl group of electricity storage device C is replaced with a methyl group, the theoretical capacity is increased from 126 mAh/g to 233 mAh/g. For example, where the decyl group of electricity storage device E is replaced with a methyl group, the theoretical electricity storage capacity can be increased from 95 mAh/g to 172 mAh/g.

As described above, an electrode active substance according to the present invention can provide an electricity storage device having a large output, a large capacity and an excellent cycle characteristic.

INDUSTRIAL APPLICABILITY

An electricity storage material according to the present invention is lightweight, difficult to be dissolved in an organic solvent, and reversibly oxidation/reduction-reactable stably and at a high energy density. Therefore, the electricity storage material according to the present invention is usable for various types of electricity storage devices. Such electricity storage devices have a large output, a large capacity and an excellent cycle characteristic. Therefore, such electricity storage devices are preferably usable for various types of mobile devices, transportation devices, uninterruptible power supplies, etc., and also various types of electrochemical devices including biochips.

REFERENCE SIGNS LIST

21 Case
22 Positive electrode current collector
23 Positive electrode active substance layer
24 Separator
25 Sealing plate
26 Negative electrode active substance layer
27 Negative electrode current collector
28 Gasket
29 Electrolytic solution
31 Positive electrode
32 Negative electrode
41 Positive electrode active substance particle
42 Conductive agent portion

The invention claimed is:

1. An electricity storage material, comprising a polymerization product which has a tetrachalcogenofulvalene structure in a repeat unit of a main chain, wherein:
the polymerization product is a copolymerization product of a first monomer and a second monomer, the first monomer containing at least one selected from the group consisting of an acetylene structure and a thiophene structure, and the second monomer containing the tetrachalcogenofulvalene structure,
the polymerization product is represented by general formula (13) shown below;
in general formula (13), X is an oxygen atom, a sulfur atom, a selenium atom or a tellurium atom; R5 through R8 are each independently at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group; and the chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom; and
R11 and R12 are each independently a chained unsaturated hydrocarbon group or a cyclic unsaturated hydrocarbon group each containing at least one selected from the group consisting of an acetylene structure and a thiophene structure, and contains at least one selected from the group consisting of a carbon atom, an oxygen atom, a nitrogen atom, a sulfur atom and a silicon atom:

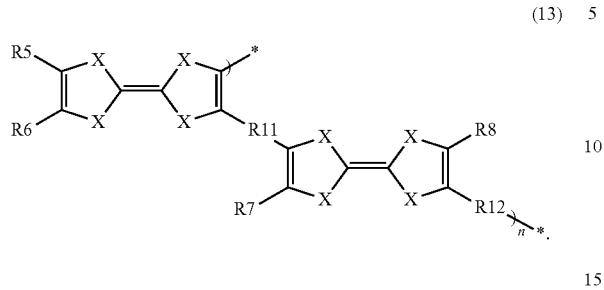

(13)

2. The electricity storage material of claim 1, wherein X is a sulfur atom; R5 through R8 are each a phenyl group, a chained hydrocarbon group or a thioalkyl group; and R11 and R12 each have a structure represented by chemical formula (14) shown below:

(14)

3. An electricity storage material, comprising a polymerization product which has a tetrachalcogenofulvalene structure in a repeat unit of a main chain, wherein:
the polymerization product is a copolymerization product of a monomer containing an acetylene structure and a monomer containing the tetrachalcogenofulvalene structure,
the polymerization product is represented by general formula (15) shown below; and
in general formula (15), Ph is a bivalent aromatic hydrocarbon group; X is an oxygen atom, a sulfur atom, a selenium atom or a tellurium atom; R5 and R6 each independently contain at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group; and the chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom:

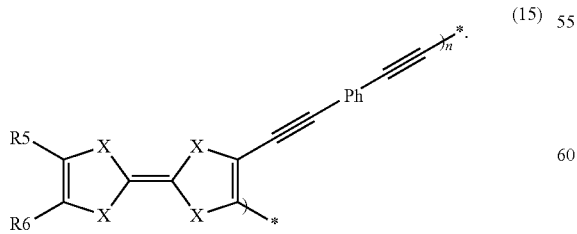

(15)

4. The electricity storage material of claim 3, wherein:
the polymerization product is represented by general formula (16) shown below; and in general formula (16), X is an oxygen atom, a sulfur atom, a selenium atom or a tellurium atom; R5, R6 and R13 through R16 each independently contain at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group; and the chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom:

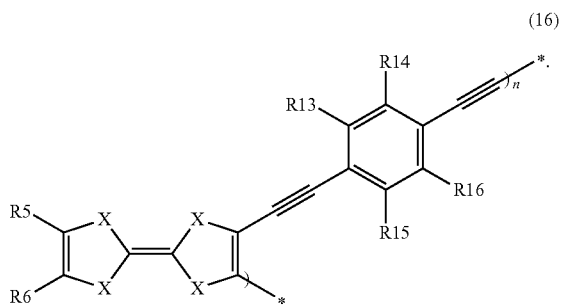

(16)

5. The electricity storage material of claim 3, wherein:
the polymerization product is represented by general formula (17) shown below; and
in general formula (17), X is an oxygen atom, a sulfur atom, a selenium atom or a tellurium atom; R5, R6 and R13 through R16 each independently contain at least one selected from the group consisting of a chained saturated hydrocarbon group, a chained unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group and a nitroso group; and the chained saturated hydrocarbon group, the chained unsaturated hydrocarbon group, the cyclic saturated hydrocarbon group and the cyclic unsaturated hydrocarbon group each contain at least one selected from the group consisting of a carbon atom, an oxygen atom, a nitrogen atom, a sulfur atom and a silicon atom:

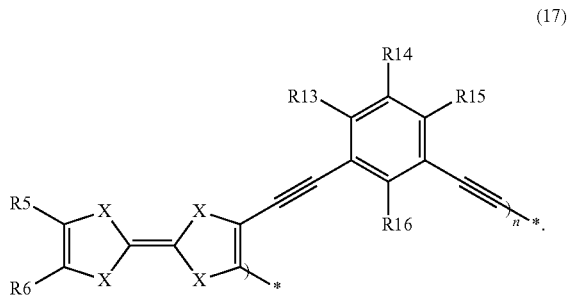

(17)

6. The electricity storage material of claim 4, wherein X is a sulfur atom; R5 and R6 are each a thioalkyl group; and R13 through R16 are each a hydrogen atom.

* * * * *